United States Patent [19]
Garehime, Jr.

[11] 4,112,818
[45] Sep. 12, 1978

[54] SURVEILLANCE AND WEAPON SYSTEM

[76] Inventor: Jacob W. Garehime, Jr., 1700 Griffith Ave., Las Vegas, Nev. 89104

[21] Appl. No.: 490,053

[22] Filed: Jul. 19, 1974

Related U.S. Application Data

[63] Continuation of Ser. No. 254,541, May 18, 1972, abandoned.

[51] Int. Cl.² .................. F41C 9/00; F41H 13/00
[52] U.S. Cl. .................. 89/41 TV; 89/134; 109/9; 244/118 P; 358/108
[58] Field of Search ............ 89/37.5 R, 37.5 A, 41 L, 89/41 TV, 134; 109/9; 178/DIG. 1, DIG. 20, DIG. 38, 7.81, 7.9; 244/1 R, 118 P, 121; 340/278; 358/108

[56] References Cited

U.S. PATENT DOCUMENTS

| | | | |
|---|---|---|---|
| 1,420,520 | 6/1972 | Cervenka | 89/28 R |
| 2,256,702 | 9/1941 | Barrack | 109/9 |
| 2,350,889 | 6/1944 | Harman | 178/7.9 |
| 3,074,055 | 1/1963 | Rudolph et al. | 340/278 |
| 3,417,198 | 12/1968 | Loyd | 89/41 TV |
| 3,618,456 | 11/1971 | Mindel | 89/134 |
| 3,711,638 | 1/1973 | Davies | 89/41 TV |
| 3,819,856 | 6/1974 | Pearl et al. | 178/DIG. 38 |

Primary Examiner—Stephen C. Bentley
Attorney, Agent, or Firm—Albert L. Gabriel

[57] ABSTRACT

The disclosure includes a surveillance and weapon system comprising a tubular, generally annularly symmetrical multiple fire weapon having optical scope means coaxially arranged in the throat thereof. Also disclosed is a remote control embodiment particularly suitable as an anti-hijacking system for the protection of commercial aircraft, but equally useful in the protection of other vehicles such as ships, trains or the like, and for the protection of various places that are frequently subject to criminal attack such as banks, prisons, courtrooms, stores, offices, and the like. Disclosed aspects of the remote control embodiment include mounting of the weapon-optics combination on a mobile unit for linear travel and pan and tilt movements for complete mobility thereof; having the mobile unit completely hidden from the protected region behind a one-way vision screen, thereby enabling the mobile unit to be remotely driven so as to follow a hijacker or other subject and for placement in advantageous positions relative to the subject, as for example to avoid an intervening hostage or avoid alignment with vulnerable aircraft structures, without the subject being aware of either the presence or the position of the mobile unit, thereby minimizing precipitous situations and avoiding retaliatory actions against the system, while nevertheless rendering the subject selectively vulnerable to offensive action by the system, including sudden incapacitation by firing directly through the one-way screen which thus functions as a destructible, replaceable part of the system. Remote surveillance and control take place at a remote station, as for example in the cockpit compartment of an aircraft, having a video surveillance screen which exhibits an image at all times directly aligned with the weapon axis and which is tilt-compensated, whereby parallax, alignment problems and disorientation of the operator are avoided, the remote station including a manual control unit drivingly coupled to the remote unit and to the weapon-scope combination thereon to produce linear travel, pan and tilt movements of the weapon-optics combination corresponding to similar movements of the manual control unit. The unique coaxial weapon-scope optics arrangement disclosed, including optics forms permitting separation and separate movement of the scope optics from the video image sensor, permit the mobile unit to have the particularly low silhouette required for concealment thereof in the ceiling area of a commercial aircraft behind the one-way screen. Also disclosed is a weapon inhibit system programmable to inhibit weapon operation when the weapon is directed toward vulnerable aircraft parts, concentrations of persons, or the like.

22 Claims, 35 Drawing Figures

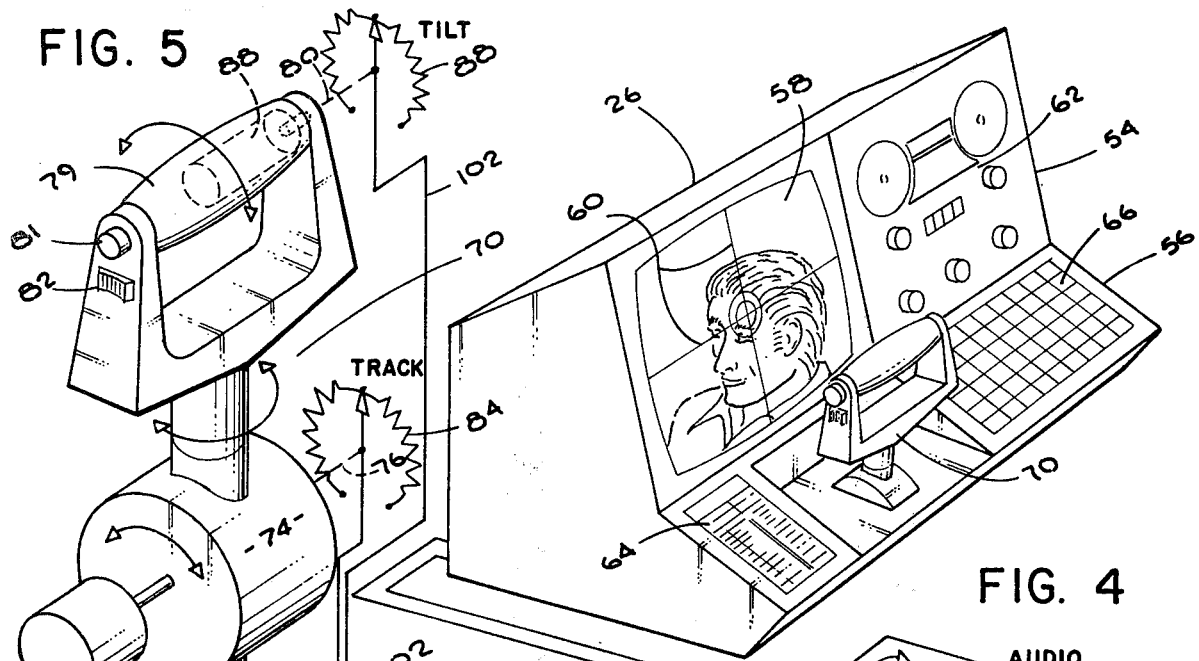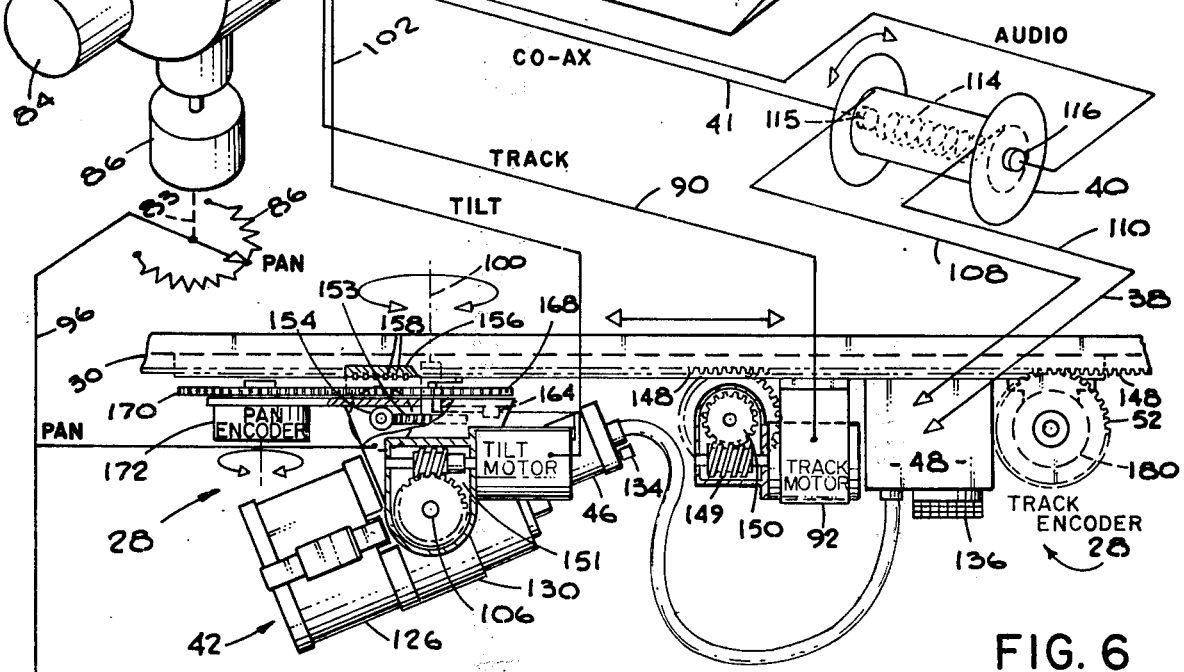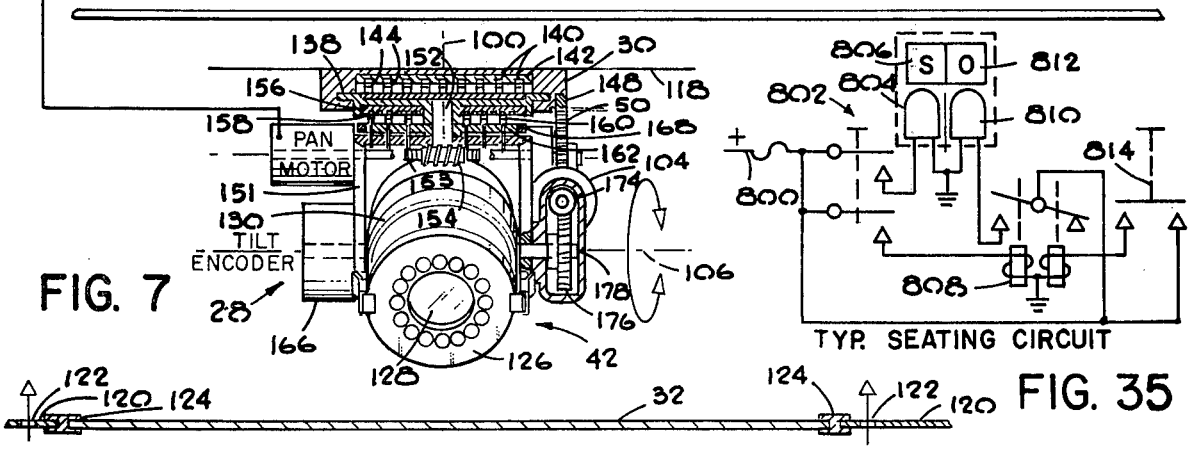

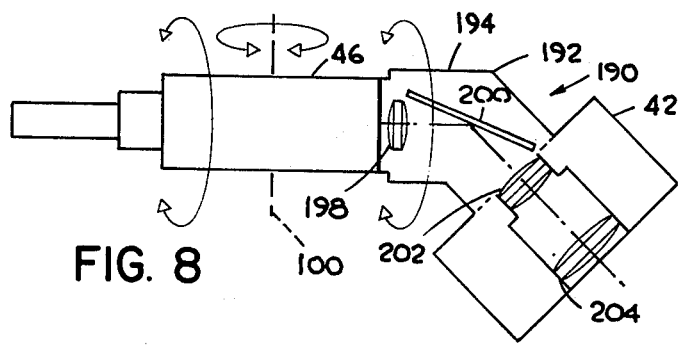
FIG. 8
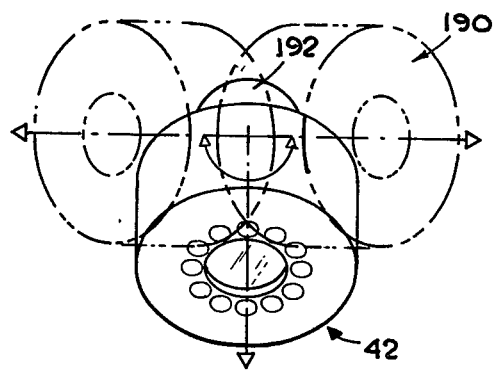
FIG. 9
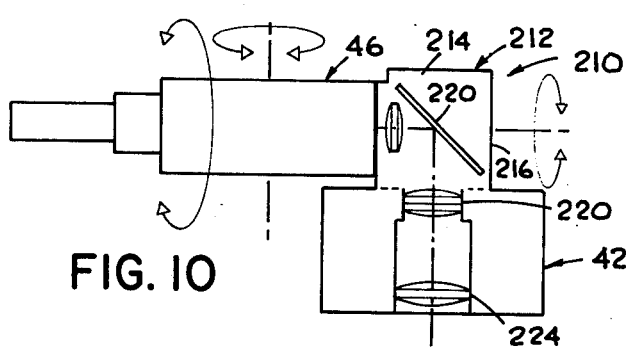
FIG. 10
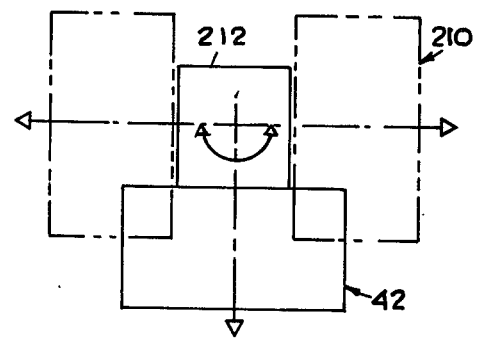
FIG. 11
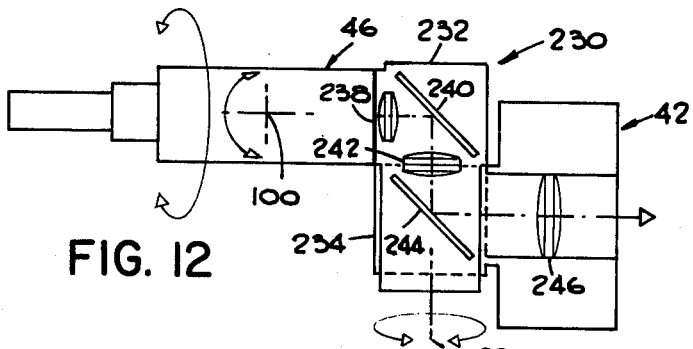
FIG. 12
FIG. 13
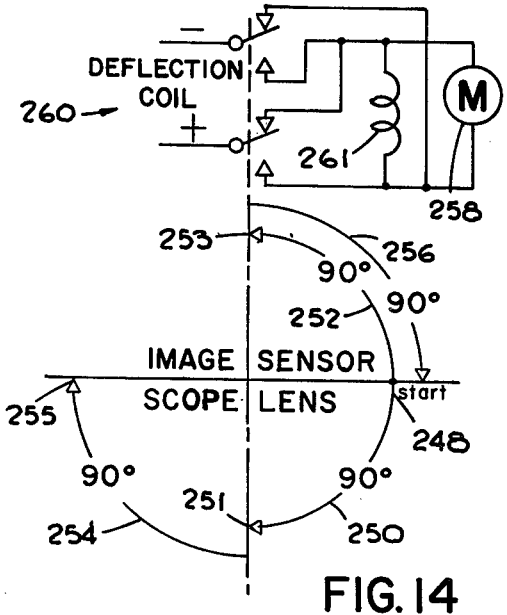
FIG. 14
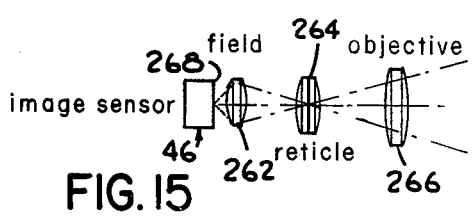
FIG. 15
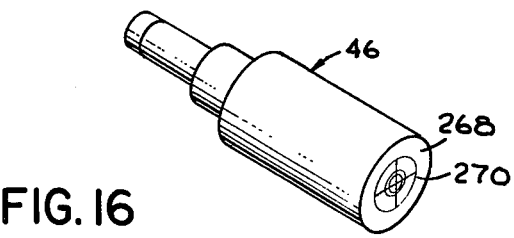
FIG. 16

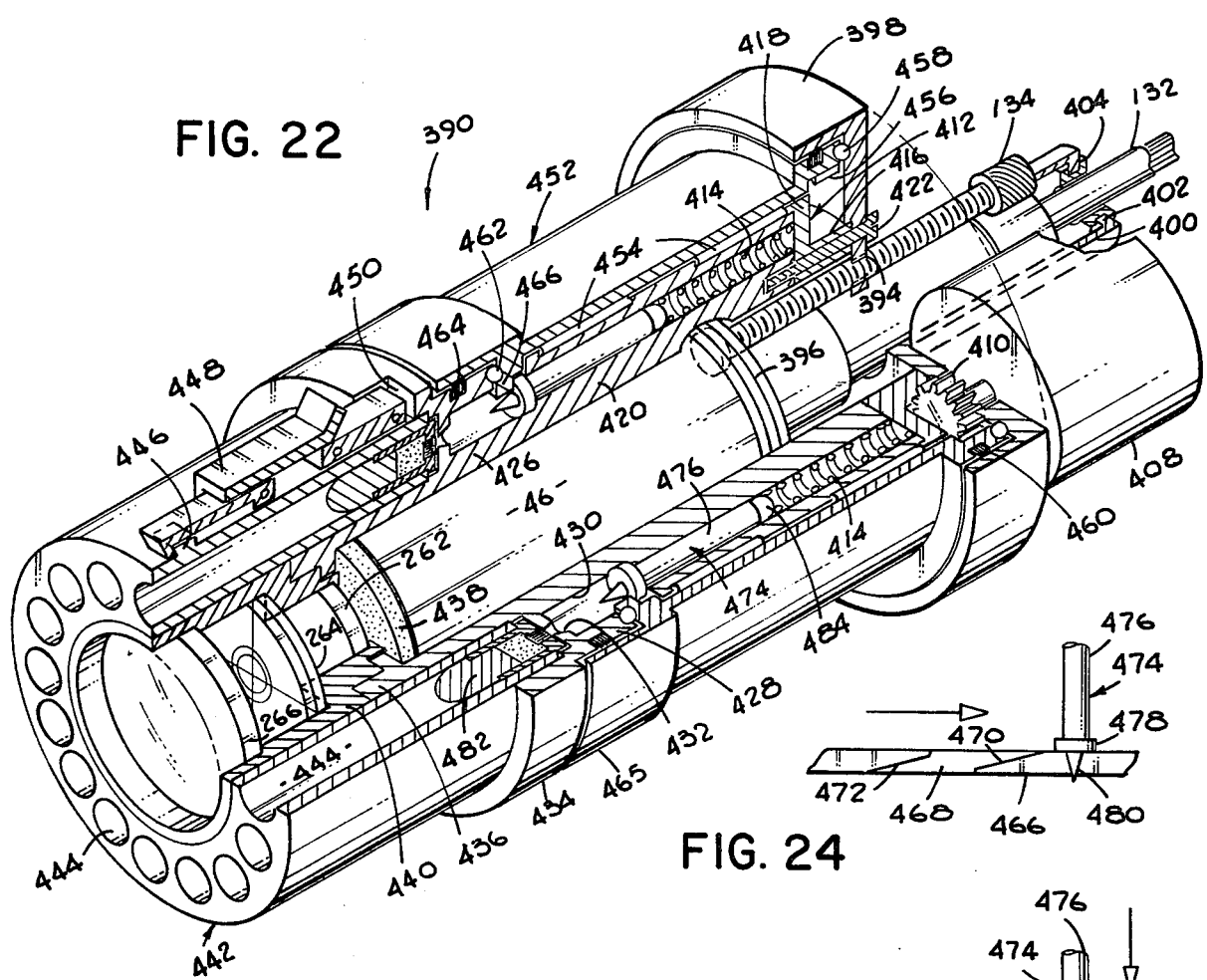
FIG. 22
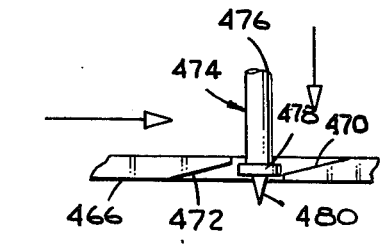
FIG. 24
FIG. 25
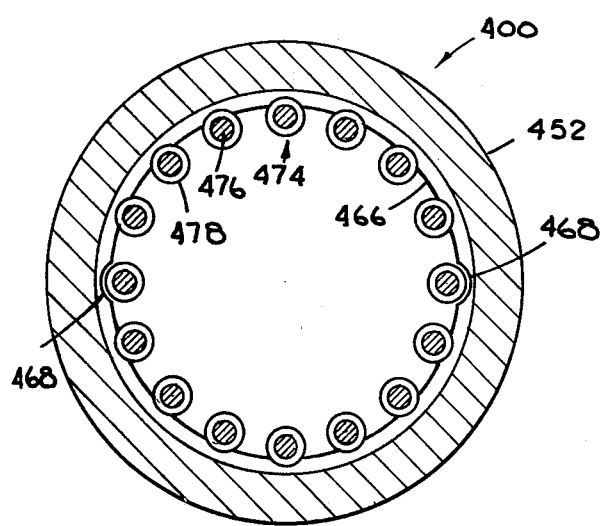
FIG. 23
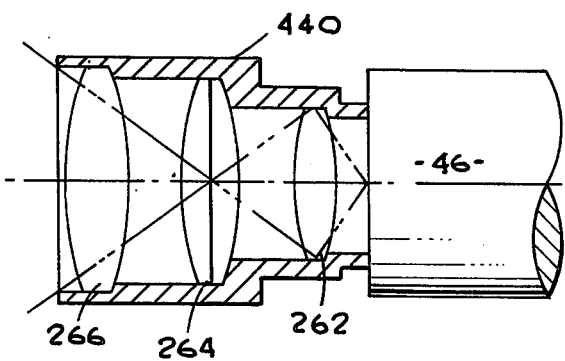
FIG. 26

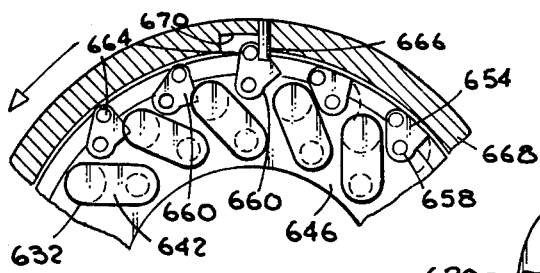
FIG. 31
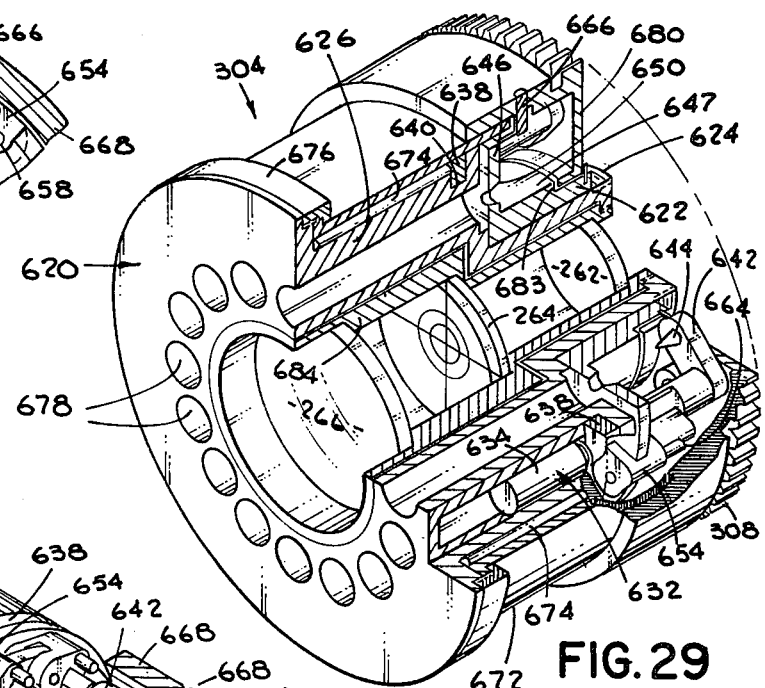
FIG. 29
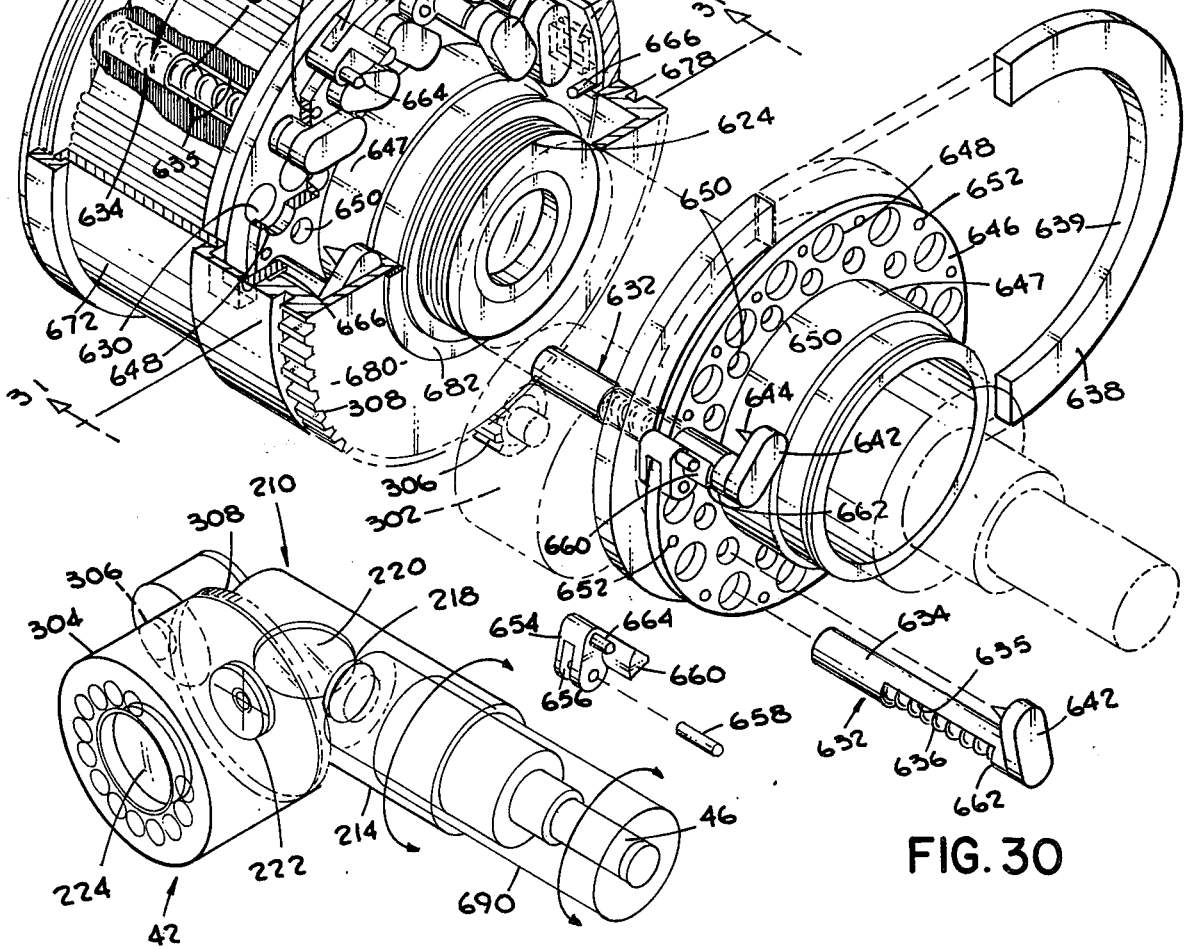
FIG. 30
FIG. 32

SURVEILLANCE AND WEAPON SYSTEM

This is a continuation of application Ser. No. 254,541 filed May 18, 1972, now abandoned.

BACKGROUND OF THE INVENTION

Prior art remote controlled, video monitored weapon systems have generally involved a combination of a whole television camera and a conventional weapon. Such combinations are inherently so bulky and space-consuming, both in the axial and vertical depth directions that they have not been usable for anti-hijacking purposes in commercial airplanes. There is simply not enough space available in the ceiling area of the conventional airplane to accommodate such TV camera/-weapon combination therein. It was inconceivable that such a bulky combination could be adapted to linear travel, pan and tilt movements so as to cover the entire passenger compartment area of an aircraft, or that it could be obscured from view of the passengers behind a one-way vision screen. Similarly, the amount of space occupied by such prior art television camera and conventional weapon combinations generally precluded the adaptation thereof for protective systems to be used in banks, prisons, stores, office buildings, or the like.

All prior art remote control, video monitored weapon systems of which the applicant is aware could be seen by a potential hijacker or criminal or the like, and hence could be defended against by retaliatory action, or could be avoided, so as to minimize the effectiveness thereof. A further problem in connection with these prior art weapon systems utilizing a TV camera and conventional type weapon, relates generally to the optics thereof. Such prior art systems embodied vertically or laterally spaced optical and weapon axes, thereby having a parallax inaccuracy inherent in the aiming thereof. This becomes a critical problem in a remote controlled weapon system for aircraft protection, because of the necessity for pinpoint accuracy to avoid damaging critical aircraft parts, and to be assured of a completely incapacitating offensive action against a hijacker or the like without danger to other occupants. This parallax problem becomes more acute as the weapon is moved closer to the subject in an attempt at increased accuracy.

The optics problem associated with a conventional television camera-weapon combination also involves an orientation problem between the subject as viewed by the television camera and the subject as displayed on a remote video monitor. Tilting movements of the television camera, and particularly tilting movements beyond the vertical axis, and also panning movement beyond 90°, with the conventional television camera optics employed in such prior art camera-weapon combinations, tended to provide a badly disoriented image at the remote monitoring station, making it difficult to track a subject in movement, and often dangerous to employ the weapon.

Prior art automatically operable weapons in general are not of unobstructed tubular configuration, and hence are incapable of having coaxially arranged optics directly mounted therein. Thus optical aiming systems for automatic weapons are conventionally laterally or vertically offset from the firing axis of the weapon, requiring that the reticle in any optical scope aiming system associated therewith also be spaced from the firing axis. Such spacing not only involves a parallax problem between reticle and weapon axis, but also involves a sometimes even more serious axial alignment problem. This can raise doubts as to the accuracy of alignment and aiming, where such doubts cannot be tolerated in the close confines and with the critical surrounding areas in an aircraft protective system. The requirement of axially offset optics with conventional automatic weapons also detracts from the compactness thereof, making them further unsuitable for use in a protective system for aircraft or the like.

Referring particularly to the commercial aircraft protection problem, the protective measures currently in use are (1) attempting to identify and observe persons who are considered by mannerism or appearance to be of a high risk "type" likely to be involved in hijacking; (2) inspecting the persons and/or baggage of airplane passengers; (3) the use of sky marshals riding the aircraft; and (4) the use of snipers to shoot hijackers if they can be lured out of the airplanes.

All of these currently used measures have serious drawbacks. In order to be effective, baggage and personal inspections are much too time-consuming to be used on any substantial scale and yet be compatible with heavy airline schedules as presently followed. Attempting to identify and watch high risk type persons is a very chancy thing, as often a hijacker will look like a very ordinary person. FBI agents have sniped or shot at hijackers with high powered rifles from strategic airport locations whenever possible, but this requires that the hijacker be lured out of the airplane, which only occasionally occurs.

The sky marshal approach has been used extensively, and it has the advantage of providing offensive action against a hijacker when the hijacker has been positively identified during flight. However, sky marshals have a tendency to place everyone in the airplane under great risk, and their effectiveness has proven to be quite limited in scope for a number of reasons. Thus, the sky marshal cannot take offensive action without danger of retaliatory action from the hijacker either against the sky marshal or perhaps indiscriminately against one or more passengers, or against a hostage. Another problem is that a weapon in the hand of a sky marshal tends to be unstable, being adversely affected by turbulence, the urgency of the situation, the danger to other persons or aircraft systems, and the like. The sky marshal cannot always choose the time or place to act, and he can be seen and acted against by the hijacker. Also, once the sky marshal precipitates action against a hijacker, he has no choice but to proceed, despite dangers that may arise to passengers. Because the sky marshal can be seen by the hijacker, it is difficult for him to cope with or to avoid the hostage problem. Finally, the deterrent effect of a sky marshal is minimal, because a potential hijacker is aware of the sky marshal's limitations, and can retaliate and defend against him.

SUMMARY OF THE INVENTION

In view of these and other problems in the art, it is an object of the present invention to provide a generally annularly symmetrical multiple fire weapon having an open and generally unobstructed throat extending through the axial center thereof.

Another object of the invention is to provide a surveillance and weapon system comprising such a generally annularly symmetrical multiple fire weapon which has optical scope means coaxially arranged in the otherwise generally unobstructed axial throat thereof.

Another object of the invention is to provide a generally annularly symmetrical multiple fire weapon of the character described which comprises a series of annularly arranged barrels with respective cartridge chambers, a series of respective pre-cocked firing pin units arranged behind the respective chambers, rotatably shiftable firing pin release means, and indexing drive means adapted to shift the firing pin release means so as to release successive firing pins and thereby energize a succession of cartridges. In presently preferred forms of this weapon diametrically opposed pairs of the cartridges are simultaneously energized to produce a double helix fire pattern that is dynamically balanced about the axis of the weapon.

Another object of the invention is to provide a tubular, generally annularly symmetrical multiple fire weapon of the character described which includes a nonrotating firing pin unit having a pair of diametrically opposed firing pins, and wherein a tubular barrel body having a series of regularly spaced barrels about its annulus is indexed between successive firing events to shift successive adjacent pairs of diametrically opposed barrels into axial alignment with the diametrically opposed firing pins, so as to provide a planar or 180°, nonrotating firing pattern that is dynamically balanced about the axis of the tubular weapon.

Another object of the invention as related to the generally annularly symmetrical, tubular multiple fire weapon per se is to provide both external and internal stepper motor drive means for actuating a tubular weapon of this character.

Another object of the invention is to provide a surveillance and weapon system which comprises a tubular, generally annularly symmetrical multiple fire weapon which has an optical scope mounted in the axial throat thereof, and which also includes a video image sensor optically coupled to the scope so as to provide a remote video image that is directly related to the central axis of the weapon. In one such weapon-optical scope-image sensor arrangement the optical scope and image sensor are both coaxially arranged, in tandem in the axial throat of the tubular weapon, and this combination is movable for surveillance and weapon aiming. In another such weapon-optical scope-image sensor form the optical scope that is mounted in the tubular weapon is only the forward portion of the system optics, the optics including a tiltable portion to provide an optical image to the electronic image sensor which is nontiltably positioned, thereby substantially reducing the axial length of the tiltable part of the weapon-optics-image sensor combination for use thereof in confined spaces, as for example in the ceiling are of an airplane as a part of an anti-hijacking system. Such tiltable optics include one form having a 45° optical deflection wherein the optics-weapon combination on the one hand and the image sensor on the other hand are rotatable or tiltable in opposite directions about the image sensor axis for variable tilting or panning movements, while nevertheless producing a properly oriented, generally untilted remote image. Another optics form involves a single right angle optical deflection, with the forward optical scope and weapon directed at right angles to the image sensor axis and tiltable about the image sensor axis; while a third optics form is of periscopic configuration involving two right angle optical deflections, and wherein the forward optical scope and weapon combination is tiltable about a horizontal axis that is normal to the image sensor axis. In such second and third optics forms, the forward optics and weapon on the one hand and image sensor on the other hand are rotatated in opposite directions during part of a tilting sweep and in the same direction in other parts of a tilting sweep, and the polarity of the magnetic yoke coil for the image sensor is reversed during portions of the sweep, whereby to provide a generally correctly oriented, untilted remote image from the system.

A still further object of the invention is to provide a remotely controlled surveillance and weapon system for the protection of aircraft and other confined regions, as for example other vehicles such as ships, trains, or the like, and various enclosures that are frequently subject to criminal attacks such as banks, prisons, courtrooms, stores, offices, and the like, which includes a weapon-optical scope-electronic image sensor combination wherein the weapon and optical scope are in fixed alignment and are movable in at least pan and tilt movements for tracking a criminal subject throughout at least a substantial portion of the protected enclosure; the weapon-optics combination being completely hidden from the protected region behind a one-way vision screen, thereby enabling the same to be remotely driven so as to track a criminal subject without the subject being aware of either the presence or the positioning of the weapon-optics combination. In the preferred form of the invention, the weapon-optics-electronic image sensor combination is mounted on a mobile unit for linear travel as well as for pan and tilt movements of at least the weapon-optics part of the combination, and this entire mobile unit is completely hidden from the protected region behind the one-way vision screen, whereby the mobile unit may be driven to a strategic placement relative to the criminal subject so that the subject can be made a close target without intervention of other persons such as bystanders, hostages or the like.

Another object of the invention is to provide a remote surveillance and weapon system wherein remote control is effected from a remote station that includes a video surveillance screen, a manual control unit that is drivingly coupled to the remote unit and to the weapon-scope combination thereon to produce linear travel, pan and tilt movements of the weapon-optics combination which correspond directly to similar movements of the manual control unit. In the preferred form of the invention the image on the video surveillance screen at the control station is directly aligned with the weapon axis and is tilt-compensated to provide an accurate, properly coordinated, generally untilted image, and reticle lines are also preferably provided by reticle means that is directly in the centered optical path in the throat of the weapon for accuracy of aiming. It is also preferred to have the manual control unit physically positioned at the control station directly in front of the video surveillance screen so that the controller will have a direct coordination between his manual movements of the control unit and the resulting visual movements observed on the video surveillance screen.

In the application of the present invention as an anti-hijacking system for aircraft, it is also preferred to have a seat exhibit board as a part of the control station, the board being responsive to pressure switch means in the individual passenger seats to indicate both seat occupancy for a particular flight and the temporary vacating of an occupied seat.

In the adaptation of the present invention as an anti-hijacking system for aircraft, it is also preferred to include a weapon fire control panel as a part of the control station, such panel having electrical circuit means associated therewith, and including switching means and light indicator means for both controlling the operation of the weapon and exhibiting to the operator the state or operative condition of the weapon at all times.

In the application of the present invention as an anti-hijacking system for aircraft, another important part of the system is the inhibit system which provides a no-go signal to the weapon control circuit to prevent firing of the weapon when it is aimed at a certain part of the aircraft which might damage some critical aircraft part, or which may endanger crew members of the aircraft. This inhibit system preferably includes an encoder unit for each type of movement of the weapon, so that in the usual anti-hijacking form of the invention, there will be separate encoder units for the linear, tilt, and pan movements of the weapon. Each of these encoder units preferably comprises either a single analog encoder wheel, or a plurality of coupled analog encoder wheels, having segments thereon which correspond to go/no-go areas in the aircraft; i.e., having such segments arranged in a binary go/no-go form. The individual encoder wheel outputs are fed to a decoder which is programmed for the particular type of aircraft, and for the particular accessory and seating arrangement therein. When the outputs of all of the encoder wheels are "no-go", then the decoder will provide a no-go signal to the weapon fire control circuit, thereby preventing the weapon from firing. However, it is preferred to have a deliberate manual override of such no-go condition of the weapon in the weapon electronic control circuit, so that the operator of the system, in a situation of dire emergency, can override the no-go signal. One example of a situation where such an override is practical is when the aircraft is on the ground, and there is no danger of loss of flight control and consequent crashing of the aircraft in the event some critical aircraft structural member is damaged.

The one-way vision screen forming a part of the invention in applications of the invention to protect an enclosed region can be in the form of a bubble or curved panel for weapon-optics installations which involve only pan and tilt type movements. However, in forms of the invention which also include linear travel movements, it is preferred to embody the one-way vision screen as a ceiling panel, wherein the one-way screen can be arranged so as to be unobtrusive and a part of the decorative motif of the enclosure. In most current commercial aircraft the passenger compartment can be substantially completely covered by having ceiling panels of the one-way vision screen extend substantially the entire length of the passenger compartment, being generally centrally arranged over the length of the aisle. Since most hijackers will at some time attempt to reach the cockpit area, if desired a special weapon-optics installation that may only involve pan and tilt movements may be installed in the forward part of the passenger compartment near the cockpit entrance, either in the ceiling or in a forward bulkhead or in a side compartment. In this case, a curved or flat panel, or a bubble of the one-way vision screen may be employed. An example of such an installation is in the Boeing 747 aircraft wherein a spiral staircase leading from the main passenger compartment upwardly to the cockpit area can be commanded from a central ceiling directly above the staircase, so that a weapon-optics combination having just pan and tilt mobility will provide good protection for the cockpit against entry from the passenger compartment.

Most modern building construction utilizes "drop ceilings" to provide space for air conditioning ducts, lighting fixtures and the like. Also, in the modernization of old buildings to add air conditioning, such drop ceilings are conventional. The present surveillance and weapon system will normally be applied in drop ceiling enclosures, for the protection of banks, prisons, stores, offices, courtrooms, and the like, by embodying the one-way screen panels as a part of the drop ceiling paneling, and there is normally ample free space between the drop ceiling and the floor above to accommodate the mobile unit of the present invention, which can be lineally movable along suitable track means, either in a straight line or in appropriate curved paths, and also movable in pan and tilt movements.

While the unique compactness of the coaxial weapon-optics combination of the present invention is important in the aircraft anti-hijacking form of the invention because of the limited vertical space available, such compactness is also important in other forms of the invention so that the weapon-optical scope combination can be disposed in spaced relationship substantially above the one-way screen. This permits a relatively wide sweep in the tilt movement direction, while still maintaining a substantial angle of incidence of the axis of the optical scope to the plane of the one-way screen, to minimize reflective light loss from the one-way screen.

In addition to the video monitoring at the control station, it is also preferable as a part of the invention to include audio monitoring so that the controller can hear what the observed subject is saying, and thereby know better what he is doing or is about to do. It is also desirable to have the audio communication two-way so that the controller can talk to the hijacker or other criminal, if this is appropriate. Additionally, it is preferable to include a video and audio recorder so as to keep a video and audio history of the hijacking or other criminal event for insurance and court purposes.

While the weapon forms are shown in detail in the present application as being adapted for conventional type firearm cartridges, it is to be understood that other types of missiles may be fired from the weapon. For example, the weapon may be adapted to shoot tranquilizer darts or pellets; it may be adapted to simply temporarily disable or distract the subject by a volley of nonlethal impact pellets; or it may be adapted to shoot chemically disabling shells. Thus, it is to be understood that the weapon can be of either lethal or nonlethal character. If desired, part of the weapon barrels may be loaded with lethal cartridges, and another part thereof may be loaded with non-lethal cartridges; and the weapon actuating circuit can be arranged for selection of either part by the operator.

In most uses of the present invention manual control by the operator of the position of the remote control unit is preferred. However, if desired, automatic positioning control may be embodied in the system, which can be programmed in connection with a seat exhibit board or the like so that the mobile unit can be automatically moved to a position proximate a particular seat or other designated area, and then manually controlled at that point.

It will be apparent from the foregoing summary, and from the following description that the present surveillance and weapon system has a number of important advantages over currently used protective measures, particularly those employed in the protection of enclosed regions such as aircraft, banks, prisons, and the like. Thus, a hijacker or other criminal suspect cannot retaliate against the system, because he cannot see the weapon, and does not know where it may be at any given time. This helps to avoid the precipitation of critical confrontation, which is likely with present sky marshal or guard protection. The present system, by its complete mobility, also lessens the seriousness of the hostage problem, because the hijacker or other criminal does not know where the weapon is, and the weapon can be moved to a position in command of the suspect without intervention from the hostage.

The accuracy of the coaxial weapon-optics of the present system is important in confined areas, generally enabling the system to be used offensively against the subject without danger to nearby persons. The accuracy is not only directly accomplished through the coaxial weapon-optics arrangement, but is aided by the capability of the weapon to fire diametrically opposed barrels simultaneously, thereby balancing torque about the weapon axis; and the accuracy is also aided by the optical scope-electronic image sensor correlation to provide a properly oriented, generally untilted video image to the operator. Accuracy is also much better for the present system than for a sky marshal, in that the weapon of the present system is supported fixedly at the time of firing relative to the airframe, whereas the weapon in the hand of a sky marshal is subject to the movability of his arm, and hence likely to be adversely affected by turbulence, or simply by the urgency of a critical situation.

A particularly important aspect of the present invention is that because it is difficult to defend against, and cannot be seen by a suspect, it has an excellent deterrent effect. Even if a complete system according to the invention were only installed in occasional aircraft, if ceiling paneling resembling that used with the present system were employed in all commercial aircraft, the deterrent effect would operate, since potential hijackers would not know whether or not a particular airplane had a complete system therein.

BRIEF DESCRIPTION OF THE DRAWINGS

FIG. 4 is a further enlarged isometric view illustrating the control console and the various functional portions thereof.

FIG. 5 is an isometric view illustrating a presently preferred control unit associated with the console for remotely controlling movement of the remote mobile unit and actuation of the weapon portion thereof.

FIG. 6 is a side elevation, with portions broken away, illustrating one form of mobile unit according to the invention wherein the optical scope and electronic image sensor are linearly, coaxially arranged.

FIG. 7 is a front end elevation, partly in transverse section, further illustrating the form of the mobile unit shown in FIG. 6.

FIG. 8 is a diagrammatic side elevational view illustrating a first form of optics employed in the present system for compacting the weapon-image sensor combination, this form utilizing acute angle light deflection.

FIG. 9 is a diagrammatic front end elevational view illustrating the tilting movements of the weapon and forward optics in the first optics form of FIG. 8.

FIG. 10 is a diagrammatic side elevational view similar to FIG. 8, but illustrating a second form of optics utilizing a 90° angle light deflection.

FIG. 11 is a diagrammatic front end elevational view illustrating the manner in which tilting movements of the weapon-forward optics combination occur in the second optics form of FIG. 10.

FIG. 12 is a diagrammatic top plan view illustrating a third, periscopic optics form utilizing a succession of two right-angle light deflections to provide maximum flexibility of the optics without sacrificing compactness.

FIG. 13 is a diagrammatic side elevational view illustrating tilting movements of the weapon-forward optics combination in the third optics form of FIG. 12.

FIG. 14 is an angle and wiring diagram illustrating the manner in which the image sensor is rotated on its axis in FIGS. 12 and 13 according to tilting movements of the weapon-forward optics combination through successive tilting quadrants.

FIG. 15 is a diagrammatic illustration of a lineal image sensor and scope optics combination which may be employed in the present system, wherein the reticle patterns are provided in a reticle lens disposed intermediate objective and field lenses.

FIG. 16 is an isometric view illustrating the provision of the reticle patterns directly on the electronic image sensor tube.

FIG. 22 is an isometric view, with portions broken away, and partly in axial section, illustrating a first weapon form according to the invention, wherein the optics and electronic image sensor are linearly arranged concentric of the weapon.

FIG. 23 is a cross-sectional view taken on the line 23—23 in FIG. 22, with portions removed, illustrating the manner in which diametrically opposed pairs of fire pins are releasable through opposed cutouts in the fire pin release ring.

FIGS. 24 and 25 are diagrammatic illustrations illustrating the inclined cam ramp configuration of one of the fire pin release ring cutouts, and the manner in which this cooperates with a fire pin for rapid fire operation.

FIG. 26 is a fragmentary side elevational view, partly in axial section, illustrating the lineal relationship of the optics and image sensor in the weapon form of FIGS. 22 to 25.

FIG. 29 is an isometric view, with portions broken away and partly in axial section, similar to FIGS. 22 and 27, but illustrating a third weapon form which is particularly compact in the axial direction and is adapted to be employed in non-lineal relationship with the electronic image sensor, utilizing optics arrangements similar to those illustrated in FIGS. 8 to 14; this third, compact weapon form being the form illustrated in connection with the mobile unit shown in FIGS. 17 to 20.

FIG. 30 is an exploded isometric view, with portions broken away and partly in axial section, illustrating further details of construction of the third weapon form shown in FIG. 29.

FIG. 31 is a fragmentary cross-section taken on the line 31—31 in FIG. 30, illustrating in detail the manner in which the firing pins are tripped in the weapon form of FIGS. 29 and 30.

FIG. 32 is a diagrammatic isometric view illustrating the weapon form of FIGS. 29 to 31 in combination with the optics form illustrated in FIGS. 10 and 11.

FIG. 35 is a wiring diagram of a seat monitoring circuit.

DETAILED DESCRIPTION

Figures 1, 2, 3:
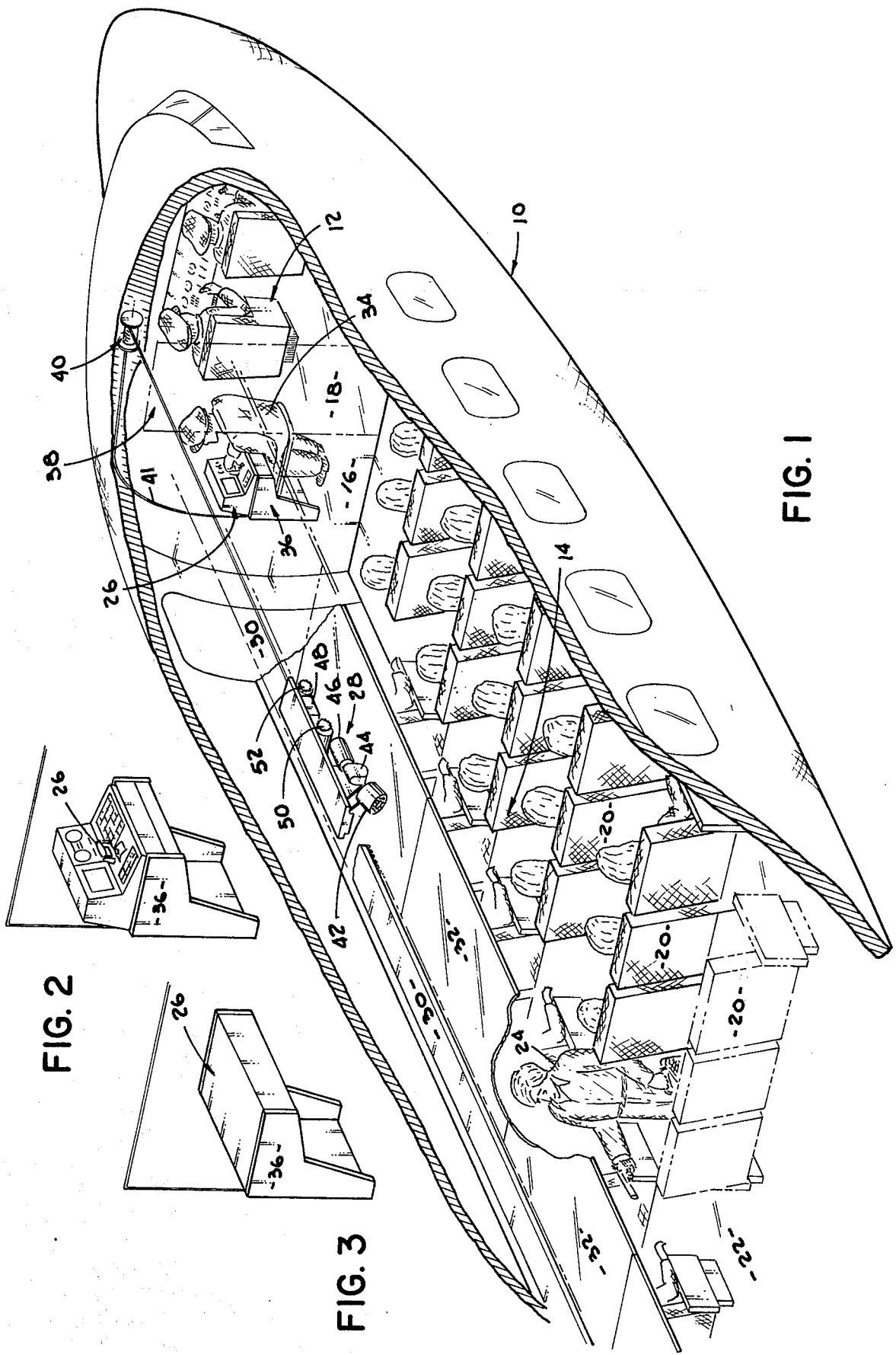
FIG. 1 is an isometric view, with portions broken away, illustrating one form of the present surveillance and weapon system operatively deployed in a typical commercial aircraft of conventional construction.
FIG. 2 is an enlarged isometric view of the control console and base in the operative position of FIG. 1.
FIG. 3 is a view similar to FIG. 2, but with the console folded and locked in the base to give the appearance of a conventional worktable.

Referring to the drawings, and at first particularly to FIGS. 1, 2 and 3 thereof, the present invention is illustrated as a total surveillance and weapon system in connection with a commercial airplane 10 of generally conventional, current design, having a forward cockpit area generally designated 12, and elongated, rearward passenger area generally designated 14, with a bulkhead 16 and doorway 18 shown in phantom separating the cockpit and passenger areas. A plurality of rows of seats 20 is disposed on opposite sides of an aisle 22 extending the length of the passenger area 14. The present surveillance and weapon system as it is employed within a commercial airplane constitutes an effective anti-hijacking system, and accordingly the system is illustrated in an operatively deployed condition in FIG. 1 relative to a hijacker or extortionist 24 shown in a typical position standing in the aisle 22 in the passenger area 14.

For most commercial aircraft applications of the present invention as an anti-hijacking system, the system includes four principal portions, namely, (1) a control or surveillance console 26, sometimes hereinafter simply referred to as the control console, which is disposed in the cockpit area; (2) a remote mobile unit 28 which includes drive means, weapon means, optical scope and video sensing means for surveillance and weapon aiming, audio means, and inhibit encoder means defining weapon go and no-go areas; (3) an overhead track 30 extending over substantially the entire length of the aisle 22; and (4) a one-way screen 32 preferably arranged as a decorative ceiling element extending substantially the entire length of the aisle, the one-way screen obscuring the mobile unit 28 and track 30 and their associated parts from the view of the passengers, while nevertheless permitting surveillance and weapon aiming therethrough from the mobile unit 28.

The one-way screen may be made of conventional glass or plastic sheet material having one-way visibility, and this one-way screen 32 is uniquely employed in the present system for both its capacity to transmit light therethrough in only one direction, and also its penetrability, by either breakage or perforation, upon actuation of the weapon. Thus, although such one-way screens have heretofore been employed for a variety of surveillance purposes, in the present surveillance and weapon system the one-way screen functions as a replaceable entity that allows surveillance and weapon aiming through it while at the same time hiding the weapon and surveillance equipment from passengers and hijacker or potential hijacker alike; and upon the necessity for firing the screen permits passage of fired missiles therethrough and is thereby damaged and must be replaced as a physical working part of the system.

The reference number 34 designates a sky marshal, flight engineer or other crew member in operative position before the control and surveillance console 26. Such crew member 34 may continuously attend the console 26 during flight, or may attend the console 26 only when alerted by an alarm from a stewardess or upon noting a seat absence signal as hereinafter described.

Also seen in FIG. 1 is a cable 38, which contains video coax and audio lines extending from the mobile unit 28 to a retracting and tensioning reel 40 that is overhead proximate the cockpit area 12, a cable section 41 then extending from the reel 40 to the console 26.

Visible in FIG. 1 as portions of the mobile unit 28 are the weapon and coaxial forward scope optics combination generally designated 42, periscope-type weapon and scope mounting means generally designated 44 which contains part of the optics; an electronic image sensor 46 which may be a diode face tube, vidicon, or other electronic image sensor; an electronics support package generally designated 48 which includes the chassis for the electronic image sensor 46; linear travel gear 50 which is a spur gear forming part of the drive system; and linear encoder gear 52, which forms part of the inhibit system.

The space that is available between ceiling and hull is so confined and restricted in commercial airplanes of present conventional construction that a present requirement of the system is that the image sensor 46 and its electronics support package 48 be spaced apart on the mobile unit 28. Factors that contribute to this requirement for separation of the electronic image sensor 46 and its support package 48 are the bulk of both the image sensor and its support package according to the present state of the electronics art, and also the requirement in the present system that the electronic image sensor 46 be rotated on on its axis or be otherwise pivoted synchronously with tilting movements of the weapon and optics combination 42 in order to provide the crew member 34 with an untilted video image at the control and surveillance console 26. Such rotational or tilting movements of the electronic image sensor 46 will be described hereinafter in more detail, particularly with relation to FIGS. 8 to 14 of the drawings.

FIG. 1 illustrates the control console 26 disposed in a convenient position that is available in most large commercial aircraft of conventional construction, namely, against the port side wall in the cockpit area behind the pilot's seat. In this position, the console is substantially completely shielded by the bulkhead 16 from view from the passenger area 14, even if the doorway 18 should be open. The console 26 is preferably completely hidden when not in use, even from persons who may enter the cockpit area 14, as illustrated in FIGS. 2 and 3, which show the console 26 as being foldable from the operative position illustrated in FIG. 2 to a closed and locked position within its base 36 so as to form a desk-like structure having the appearance of a simple utility table.

FIG. 4 illustrates the principal operative portions of the control and surveillance console 26 in its presently preferred form. The console includes an upper panel portion 54 primarily employed for surveillance purposes, and a lower panel 56 primarily employed for control purposes. The upper panel portion 54 includes a video screen 58 that is normally employed for surveillance purposes, but which is also used by the operator in aiming the weapon. A reticle image 60, preferably including both cross hairs and centering rings, is visible on the screen 58. This reticle image 60 is preferably provided directly from reticle patterns disposed in coaxially centered relationship with the weapon itself on the mobile unit 28, either in the optics or on the image sensor, so as to preclude any possibility of misalignment or parallax in the aiming of the weapon. Alternatively, the reticle image 60 may be derived from reticle patterns provided directly in the console 26, as for example provided directly on the screen 58; however, this approach requires assurance of proper alignment between the optics-image sensor-weapon combination in the mobile unit 28 on the one hand, and in the video portion of the control console 26 on the other hand. Highly refined accuracy in the ability to aim the weapon from the remote control console 26 is critical in the commercial aircraft environment because of such factors as the presence of large numbers of persons in relatively closely confined quarters, the danger of damage to perhaps critical aircraft structures in the event of a miss, and the danger of retaliatory action by the hijacker in the event of a miss or of an inaccurate shot which is not immediately totally incapacitating. The provision of the reticle pattern in directly coaxial relationship with the weapon is therefore much the preferred arrangement in the present system.

Similar factors also make the remote aiming critical in other environments for which the invention is particularly well adapted, as for example in a bank installation of the present surveillance and weapon system. A bank presents a protection problem that is very similar to that of a commercial airplane, in that it is a frequent target for the armed bandit; the problem occurs in an enclosure, in this case generally a large room rather than the passenger compartment of an aircraft, wherein there are likely to be many persons in closely spaced relationship, and there is ceiling structure above which the mobile portion of the present invention may be disposed behind a one way screen. In the aircraft environment it is important to have the control and surveillance portion of the system isolated in a separate compartment from the compartment in which the problem is likely to arise, and which can be locked so as to be completely inaccessible to the hijacker. Similarly, in the bank environment it is also important that the control and surveillance portion of the system be located elsewhere than in the main bank room where the robbery is likely to occur, so as to be inaccessible to the robber and not subject to retaliatory action. Thus, in the bank installation, the control console may simply be located in another room in the bank, and may either be continually operative and monitored, or may be turned on in response to an alert from a teller or other person in the main banking room. Alternatively, a plurality of banks may be monitored and controlled from a single central station, as for example from a police station, and this may be accomplished through either a closed circuit video system or an open circuit video system. The open circuit-type video system can involve an emergency takeover by the central controller of a local television channel, as for example an educational channel, to provide the necessary video connection from any one of a number of banks in the locale to the central station.

Such monitoring and control of a plurality of banks from a single central control station may involve the use of only a single control console which can be switched into communication with any of the banks being serviced; or alternatively a separate control console may be connected with the remote unit in each bank.

In aircraft installations of the present invention it is preferred to have each system individually controlled from the cockpit of the aircraft, because the aircraft is in the nature of a "ship" and final authority and decision is in the captain of the individual aircraft. Thus, although a central ground control can be provided for a plurality of airplanes, it is not contemplated to be the normal arrangement.

Another "indoor" type environment for which the present surveillance and weapon system is particularly well suited is prisons, as a deterrent and preventive measure to control riots and attempted escapes.

Various other environments for which the present surveillance and weapon system may be adapted, as well as the advantages of the present system in its various environments, will become more apparent during the course of the following detailed description of several presently preferred embodiments.

Referring again to FIG. 4, the upper panel portion 54 of the console 26 also includes a video and audio recorder generally designated 62 for preserving a record of events in which the system is utilized. The reference numeral 62 also generally indicates audio components of the system, which includes a speaker for audio observation of the region proximate the mobile unit, and also preferably includes a microphone enabling the operator of the console to communicate with a subject being observed.

The lower panel portion 56 of control console 26 includes a weapon fire control panel 64, a seat signal board 66, and a manual control unit 70. The fire control panel 64 is shown and described in detail in connection with FIGS. 33 and 34 of the drawings. The seat signal board 66 is electrically connected to each seat or to each row of seats so that in its energized condition light signals on the seat signal board 66 will, through electrical switching means in the individual seats, indicate the vacating of either an individual seat or one of a particular row or group of seats. By this means the seat signal board 66 facilitates observation of suspicious passengers in the aircraft by instantly alerting the controller when such person arises from his seat. A presently preferred seat monitoring circuit and operation thereof will be described hereinafter in connection with FIG. 35.

It is to be noted in FIG. 4 that the manual control unit 70, which is in the general form of a control column or stick, is positioned directly below and in front of the video surveillance screen 58. This is a particularly useful arrangement to facilitate coordination of manual control movements of the control unit 70 in response to movements of the subject as observed on the video surveillance screen 58.

Referring now particularly to FIG. 5 of the drawings, the control unit 70 is illustrated in detail in this figure, and to facilitate an understanding of the control functions of the control unit 70, three control potentiometers for the respective lineal, pan and tilt control movements are schematically illustrated on the respective movement axes and are electrically connected to the corresponding lineal, pan and tilt motors in the mobile unit 28 shown in structural detail in FIGS. 6 and 7. Similarly, video and audio electrical connections are schematically illustrated between the control console shown in FIG. 4 and the mobile unit as shown in FIGS. 6 and 7.

The control unit 70 includes a generally cylindrical pivoted base 74 that is mounted in the lower panel portion 56 of console 26 for pivoting movement about a horizontal, transverse axis 76. Generally upright control shaft 77 extends upwardly from the pivoted base 74 and terminates at its upper end in a control yoke 78. A control handle 79 is rotatably or pivotally supported between the bifurcations of the yoke 78 on a pivot axis 80 that is at right angles to the axis of the shaft 77. A trigger switch 81 and a trigger safety switch 82 are disposed on the left-hand side of the control yoke 78 for convenient access to the thumb of a controller who has his right hand on the control handle 79. The control yoke 78 is rotatable or pivotal about pivot axis 83, which is the axis of the shaft 77.

Linear or track controller 84, which may be a potentiometer as illustrated, is operatively connected to the pivoted base 74 so as to provide an output signal corresponding to forward and rearward movements of the control handle 79, which movements cause forward and rearward tilting movements of the shaft 77 and consequent pivoting movements of the base 74 about its axis 76.

Pan controller 86, which may be a potentiometer as illustrated, is operatively connected to the yoke 78 through shaft 77 so as to provide an output signal corresponding to pivoting movements of the control handle 79 and yoke 78 about the pivot axis 83 of the shaft 77.

Tilt controller 88, which may also be a potentiometer as illustrated, is operatively connected between the control handle 79 and the yoke 78 so as to provide an output signal corresponding to forward and rearward pivoting or tilting movements of the control handle 79 in the control yoke 78 about the pivot axis 80.

Coordinating the manual control unit 70 as illustrated in FIG. 5 and its respective linear, pan and tilt controllers 84, 86 and 88, with the mobile unit 28 as illustrated in FIGS. 6 and 7, linear or track conductor 90 connects the linear or track controller 84 of FIG. 5 with the linear or track motor 92 as shown in FIG. 6 so as to drive the mobile unit 28 forwardly or rearwardly along the track axis 94 pursuant to respective forward or rearward movements of the manual control unit 70.

Similarly, pan conductor 96 connects pan controller 86 of FIG. 5 with pan motor 98 as shown in each of FIGS. 6 and 7 to provide clockwise or anticlockwise panning movements of the weapon-optics combination 42 about the vertical pan axis 100 in response to respective clockwise or anticlockwise pivoting movements of the control handle 79 and yoke 78 about the axis 83.

A tilt conductor 102 connects the tilt controller 88 of FIG. 5 with tilt motor 104 as shown in FIG. 6 so as to tilt the weapon-optics combination 42 about its tilt axis 106 in either direction pursuant to respective tilting movements of the control handle 79 about its axis 80 in the yoke 78.

While the controllers 84, 86 and 88 illustrated in FIG. 5, the respective conductors 90, 96 and 102, and the respective motors 92, 98 and 104 shown in FIGS. 6 and 7, are illustrated as being electrically operable, it will be understood that they may alternatively be hydraulically or pneumatically operable within the scope of the invention.

As is schematically illustrated with respect to the controllers 84, 86 and 88, the control deflections of the manual control unit 70 from the neutral positions (which are the positions in which the controllers 84, 86 and 88 are illustrated) cause corresponding movements of the weapon-optics combination 42 at rates that are generally proportional to the amounts of deflection, movements of the weapon-optics combination 42 stopping when the three movable portions of the control unit 70 are returned to their neutral positions. In this manner, the control functions operate in a manner similar to aircraft controls, so as to be comfortable and familiar to an operator who is experienced in aircraft operation. Also, the control motions of the manual control unit 70 are closely related to the movements that are observed on the video surveillance screen 58. This relationship is a direct one, in that forward movement of the control unit 70 causes forward lineal movement of the mobile unit 28 along the track 30 in the direction as viewed on the screen 58; pivoting movement of the control handle 79 and yoke 78 clockwise about axis 83 will cause panning movement of the weapon-optics combination 42 to the right as viewed on screen 58, and vice versa; and forward or overhand tilting movement of the control handle 79 about its axis 80 on yoke 78 will cause a corresponding downward tilting movement of the weapon-optics combination 42, and vice versa.

If desired, the control unit 70 and its movable portions may be spring-loaded toward their neutral positions, so that upon release thereof they will automatically return to the neutral positions, in which positions the mobile unit 28 and the weapon-optics combination 42 are stationary on all three axes, the lineal or track axis 94, the pan axis 100, and the tilt axis 106.

As schematically illustrated in relation to FIGS. 4 and 6, the cable 38 from electronics support package 48 includes a video coax 108 and audio line 110, these being connected through reel 40 to respective video coax 111 and audio line 112 in cable 41 leading to the console 26. The reel 40 includes tensioning and return spring 114, and also includes a coaxial slip ring 115 to provide connection between coaxes 108 and 111 and an audio slip ring 116 to provide connection between the audio lines 110 and 112.

Referring now particularly to FIGS. 6 and 7, these figures illustrate details of one transport system or mobile unit 28. This and other transport systems employed in the passenger compartment area of a conventional commercial airliner will have generally the same track, ceiling and one-way screen arrangement. The track 30 is supported on fuselage structure generally designated 118 spaced above the one-way screen 32 and ceiling 120. Ceiling 120 is provided with a series of slots 122 adjacent to the one-way screen 32 along the length thereof as audio sound passages. While the one-way screen 32 may be supported in any desired manner, one manner of support is connection thereof along its side edges with adjoining edges of the ceiling 120 by means of longitudinally arranged, slotted connector strips 124. For convenience in fabrication and mounting, the one-way screen 32 will normally be composed of a series of generally flat screen panels as best illustrated in FIG. 1. The weapon-optics combination 42 will, in its centered pan position as best illustrated in FIG. 7, normally be generally laterally centered above the one-way screen 32, and the one-way screen 32 will extend a substantial distance on either side of the weapon-optics combination 42, so that seating areas along the sides of the passenger compartment are accessible to the weapon-optics combination 42.

Figure 27:
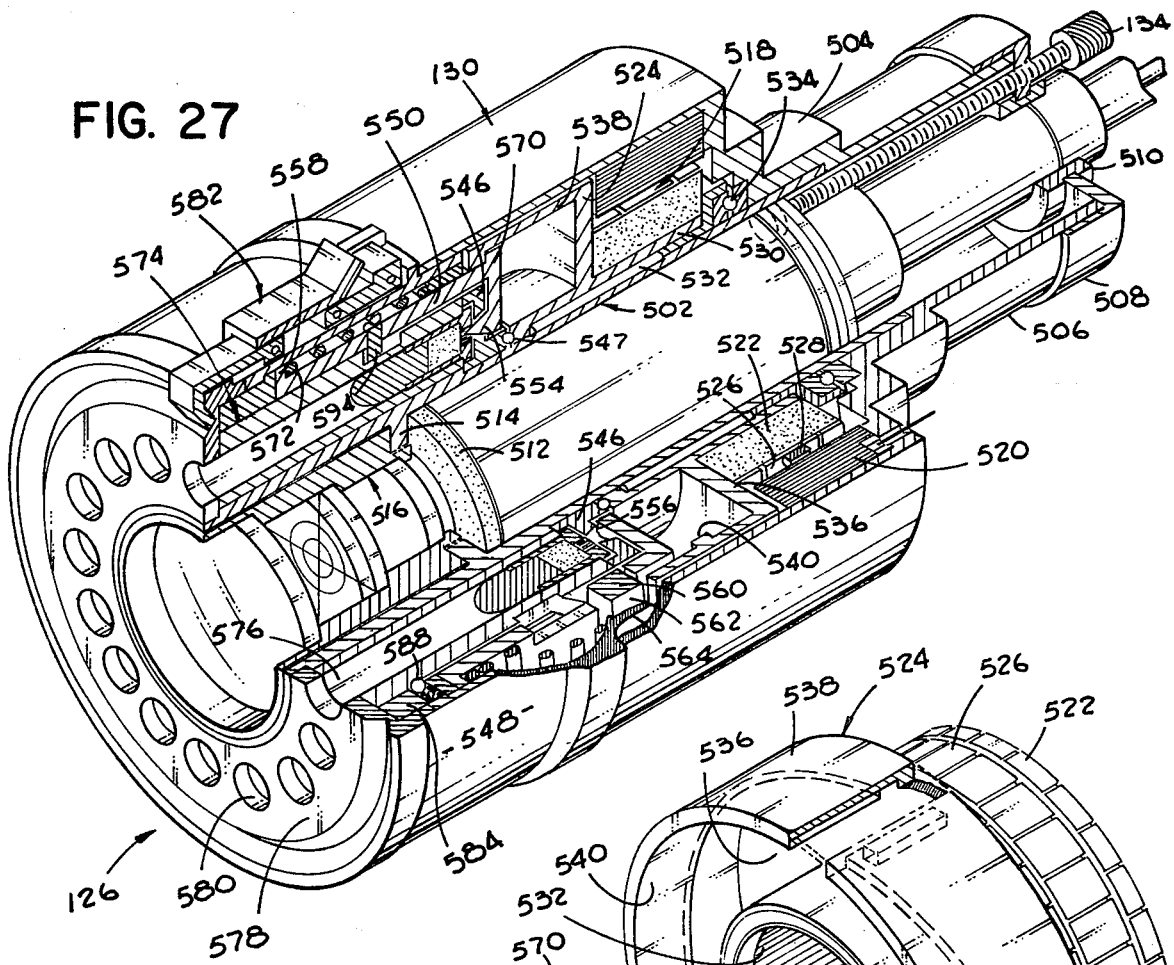
FIG. 27 is an isometric view similar to FIG. 22, with portions broken away and partly in axial section, but illustrating a second weapon form which also has a lineal optics-image sensor combination, but which differs from the first weapon form in having a self-contained stepper motor; the weapon form of FIG. 27 being similar to that employed in the mobile unit shown in FIGS. 6 and 7.
Figure 28:
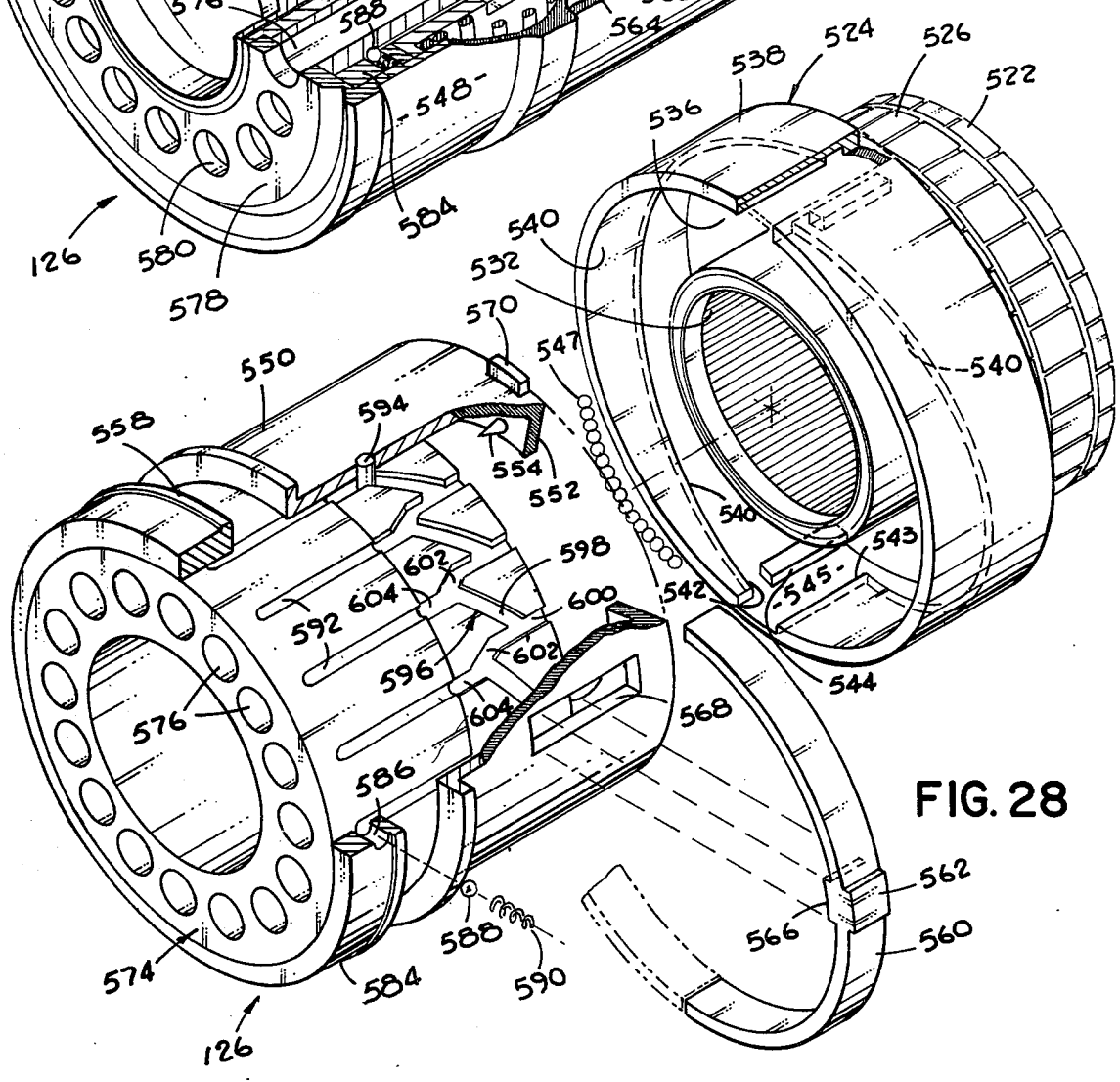
FIG. 28 is an exploded isometric view, with portions broken away and partly in axial section, showing further details of the second weapon form shown in FIG. 27.

The weapon which is a part of the weapon-optics combination 42 illustrated in FIGS. 6 and 7 is generally designated 126, and is the second weapon form that is illustrated in FIGS. 27 and 28 of the drawings and described in detail in connection with those figures. This weapon form 126 embodies a lineal arrangement 128 of the optics and the image sensor 46, the weapon 126 and optics-image sensor arrangement 128 being supported in housing structure 130.

A cable section 132 is shown connected between the image sensor 46 and the electronics support package 48 to provide video connection therebetween, while nevertheless allowing the various pivoting and tilting movements of the image sensor 46 on the mobile unit 28 relative to the fixed positioning of the electronics support package 48 on the mobile unit 28. If desired, wiring for weapon actuation may also be included in cable section 132. Audio unit 136 is mounted on the support package 48, and includes a microphone for audio monitoring, and preferably also includes a speaker for two-way communication between the controller and a hijacker or the like. The entire mobile unit 28 is supported on a car or traveling base that is generally designated 138 and is longitudinally movable in the track 30.

The track 30 is preferably in the form of a wide, shallow, inverted U, with the car 138 having side flanges engaged in slots in the depending sides of the U, and with a series of parallel, spaced, electrical contact strips or bus bars 140 mounted on an insulated carrier board 142 extending across the inside of the base of the track 30. Track wipers 144 ride on the respective contact strips 140, and are supported on the car 138 by means of an insulated carrier board 146. A downwardly exposed rack 148 extends along the length of one of the sides of track 30 and is engaged by linear travel spur gear 50. The track motor 92 drives a worm 149, which in turn drives a worm gear 150 that is connected to the lineal travel gear 50 to drive the latter along the rack 148.

A supporting yoke body 151 for the weapon-optics-image sensor combination pivots about the vertical pan axis 100, being pivotally mounted on vertical shaft 152 that is fixedly connected to the car 138, depending therefrom. Vertical shaft 152 has a fixed worm gear 153 on its lower, free end, and a worm 154 rotatable on yoke body 151 is engaged with the fixed worm gear 153. Pan motor 98, which is fixed to the yoke body 151, drives the worm 154 which climbs around the fixed worm gear 153 so as to pivot the yoke body 151 in panning movement about the pan axis 100.

Electrical connections are made from the car 138 to the pivotal yoke 151 to energize the drives associated with the yoke 151, and also if desired to actuate the weapon 126, by means of a slip ring disc 156 mounted in the car 138 and having a plurality of spaced annular contact strips 158 thereon which are coaxial with the pan axis 100. A plurality of corresponding contact wipers 160 are supported on an insulated gear body 162 fixed to the yoke body 151, the leads for contact wipers 160 extending through the insulated gear body 162 and being wired to a junction strip 164 on yoke body 151 which provides the required electrical connections for the pan and tilt motors 98 and 104, respectively, for tilt encoder 166, and if desired also for energizing the weapon 126.

A ring gear 168 forming the periphery of the insulated gear body 162 drives pan encoder gear 170 which is connected to the pan encoder 172.

A tilt worm 174 is rotatably supported on the yoke body 151 and driven by tilt motor 104. The tilt worm 174 is operatively engaged with tilt worm gear 176, which in turn is fixed on weapon tilt shaft 178 that provides trunion-like mounting of the weapon-optics-image sensor body 130 in the yoke body 151. Accordingly, the tilt motor 104 drives the housing structure 130 for tilting movement on shaft 178 through worm 174 and gear 176. The tilt encoder 166 is supported on yoke body 151 and is also operatively connected to the tilt shaft 178.

A linear or track encoder 180 is driven off of the rack 148. The linear encoder 180 may comprise a single encoder wheel driven through reduction gears to have only one revolution for the entire length of the track, or alternatively, it may comprise a plurality of related encoder wheels, such as units and tens encoder wheels for better resolution.

It will be noted that the linear, pan and tilt movements of the housing structure 130 supporting the weapon 126, optics 128 and image sensor 46, are all actuated through worm drives for self-locking actuation as to all axes against slippage from weapon recoil or otherwise. It is to be further noted that the weapon and scope axis is centered relative to the pan axis 100 and also relative to the tilt axis 106; such centering coupled with a firing mode of the weapon 126 wherein simultaneous firing occurs on opposite sides of the weapon-optics axis, results in substantially no recoil torque being applied relative to either the pan axis or the tilt axis.

Reference will now be made to sheet 3 of the drawings on which three different optics arrangements are illustrated with relation to the weapon and image sensor, these optics arrangments permitting minimization of the space depth occupied by the weapon, optics and image sensor. Such space depth minimization is important in the commercial aircraft environment of the present invention because of the very limited amount of vertical space that is available above the ceiling structure having the one-way screen therein. The three different optics arrangements illustrated on sheet 3 of the drawings all avoid the requirement that the electronic image sensor tube 46 (which necessarily has substantial length) be tilted along with the weapon and forward optics. With these three optical systems, only the weapon and a forward portion of the optics coaxial with the weapon are tilted, and the image sensor tube remains in fixed position relative to the tilt axis, with its only movements being a pivoting about the pan axis and a pivoting thereof about its own longitudinal axis to compensate for tilting of the forward optics portion so as to result in an untilted image at the control console to avoid operator confusion.

The first optics form is illustrated in FIGS. 8 and 9, and is generally designated by the reference numeral 190. The optics form 190 involves acute angle mirror prism deflection of the light from the axis of the weapon and forward optics combination to the axis of the image sensor. Optics form 190 includes a tubular body 192 in the form of an obtuse angle elbow. Tubular body 192 includes a rearward axial section 194 that is coaxial with the image sensor 46, but which has a rotational connection therewith permitting relative rotation between the image sensor and body 192. Tubular body 192 also includes a forward angle section 196 upon which the weapon-forward optics combination 42 is fixedly mounted.

A field lens 198 is mounted in the axial body section 194 so as to be coaxial with the image sensor 46; an objective lens 200 and a reticle lens 202 are coaxially mounted in the weapon so as to be a part of the weapon-optics combination 42; and acute angle deflector 204 is arranged to deflect light from the axis of the weapon-forward optics combination 42 to the axis of the image sensor, the deflection angle illustrated being about 45°.

The acute angle deflection form 190 of optics provides two alternative modes of operation. In one mode of operation, the image sensor 46 can be locked in parallel to the track 30 so as to not pivot about the vertical pan axis 100, and than a combination panning and tilting action can be provided by simply tilting tubular body 192, and hence also the weapon and forward optics combination 42, about the image sensor axis from side to side as indicated in FIG. 9, wherein the solid line illustration shows the weapon-optics combination aimed forwardly and downwardly, while the phantom line illustrations show the weapon-optics combination 42 aimed toward the sides.

The other mode of operation that can be employed with the optics form 190 shown in FIG. 8 is to lock the tubular body 192, and hence the weapon-forward optics combination 42, against tilting from the position illustrated in FIG. 8 and the solid line position of FIG. 9, and then pivoting the entire combination of image sensor 46, tubular body 192 and weapon-optics combination 42 about the vertical pan axis 100 so as to swing the weapon-forward optics combination from side to side.

The second optics form 210 shown in FIGS. 10 and 11 involves a right angle mirror or prism deflection of the light path. Optics form 210 utilizes a tubular body 212 in the form of a 90° angle elbow having an axial section 214 rotatably coupled relative to the image sensor tube 46 and having a 90° angle section 216 to which the weapon-forward optics combination 42 is secured. In order from the image sensor end of the light path are a field lens 218 in the body 212 and axially aligned with the image sensor 46; the 90° angle deflector 220 in body 212; and reticle lens 222 and objective lens 224 in the weapon-forward optics combination 42.

The normal mode of operation for the second optics form 210 as shown in FIGS. 10 and 11 is to travel along the track 30 with the image sensor tube 46 disposed crosswise to the direction of travel along the track. Thus, as viewed in FIG. 10, the second form 210 is arranged to travel along the track in a direction normal to the plane of the drawing sheet. As viewed in FIG. 11, in this mode of operation the optics form 210 will travel along the track either to the right or to the left parallel to the plane of the page. It will be assumed that the direction to the right in FIG. 11 is the forward travel direction, and that the direction to the left is the rearward travel direction. Referring to FIG. 11, as the weapon-forward optics unit 42 tilts downwardly from the right-hand phantom line horizontal position toward the 90° solid line position, the image sensor 46 rotates in the opposite direction but at a synchronous rate so as to compensate for the tilting and thereby prevent the image presented at the console 26 from being tilted. Then, as the weapon-optics combination 42 swings rearwardly or to the left in FIG. 11 beyond the solid line 90° or vertical position toward the left-hand phantom line horizontal position, the image sensor tube 46 is rotated in the same direction as the tilting of the weapon-optics combination 42 to continue to prevent tilting of the image at the console 26. Also, as the weapon-optics combination 42 passes rearwardly through the vertical position, the polarity of the magnetic yoke coil of the image sensor tube 46 is reversed to prevent image inversion and consequent disorientation at console 26. Then, as the weapon-optics combination 42 swings back down from the rearward position to the left in FIG. 11, toward the vertical or 90° position, the image sensor tube 46 is synchronously rotated in the same direction until the weapon-optics combination 42 reaches the 90° position shown in solid lines, at which time the polarity of the image sensor coil is again reversed and the image sensor tube is again oppositely rotated until the forward or right-hand phantom line position of the weapon-optics combination 42 is achieved.

Panning of the second optics form shown in FIGS. 10 and 11 is achieved by simply rotating or pivoting the entire device 210 about the vertical pan axis 100, normally with the weapon-optics unit 42 somewhere between the vertical or 90° solid line position shown in FIG. 11 and one of the forward or rearward horizontal positions shown in phantom lines in FIG. 11.

By synchronizing the tilting of the weapon-forward optics combination 42 with the rotation of image sensor tube 46 so that the direction of rotation of the image sensor tube 46 and the polarity of its magnetic yoke coil are reversed as the weapon-optics combination 42 passes through the vertical or 90° position, it is unnecessary at any time to pan around all of the way through roughly 180°. This is a big advantage if the subject being surveyed walks directly under the mobile unit in the forward-rearward direction (generally parallel with the track 30), or if the mobile unit should be shifted in the lineal direction along the track so as to cover the subject from his other side (as for example to avoid firing into a hostage). If it were necessary to pan all of the way around, the subject would be out of view for a substantial part of the panning movement, whereas being able to tilt through a full 180° as illustrated in FIG. 11 enables the subject to be kept constantly in view as he walks under the mobile unit, or as the mobile unit passes over him; and this is accomplished without the image at the control console 26 being either tilted or inverted.

FIGS. 12, 13 and 14 illustrate a third optics form 230 which is generally periscopic in structure and operation. The optics form 230 includes an axial body portion 232 coupled to the image sensor 46 for rotational movement of image sensor 46 relative thereto; a lateral body portion 234 extending laterally from one side of the axial body portion 232 and pivotal relative to the axial body portion 232 about a transverse, horizontal pivot axis 236. The weapon-forward optics combination 42 is connected to lateral body portion 234 with the axis of weapon-optics combination 42 arranged normal to the transverse pivot axis 236 of lateral body portion 234.

Optics components of the third optics form 230 in order starting from the image sensor 46 include a field lens 238 disposed in the axial body portion 232 in axial alignment with image sensor tube 46; a first 90° light deflector 240 disposed in the axial body portion 232; reticle lens 242 arranged to be coaxial with the transverse pivot axis 236, and disposed in either the axial body portion 232 or the lateral body portion 234; a second 90° light deflector 244 disposed in the lateral body portion 234 and arranged to deflect light between the axis of the weapon-forward optics combination 42 and the transverse pivot axis 236; and finally objective lens 246 forming a part of the weapon-optics combination 42 and coaxially disposed in the throat of the weapon.

According to the normal mode of operation of the third optics form illustrated in FIGS. 12, 13 and 14, the transverse pivot axis 236 of lateral body portion 234 always remains horizontal as illustrated in the top view of FIG. 12 and the side view of FIG. 13. Panning is accomplished by pivoting of the entire third optics form 230 about the pan axis 100 which is diposed up and down parallel to the plane of the drawing sheet in FIG. 13, and normal to the drawing sheet in FIG. 12. Tilting is accomplished by pivoting of the lateral body portion 234 and the attached weapon-forward optics combination 42 about the transverse pivot axis 236 from a generally horizontal forward position as shown in FIG. 12 and in the phantom lines on the right side of FIG. 13, downwardly through the vertical or 90° position shown in solid lines in FIG. 13, and thence on rearwardly through a second 90° of pivoting. The lower phantom line position of the weapon-optics combination 42 in FIG. 13 has been pivoted downwardly and rearwardly through approximately 115° from the forward, horizontal position.

The third, periscopic optics form 230 provides more flexibility of operation than either the first form 190 shown in FIGS. 8 and 9 or the second form 210 shown in FIGS. 10 and 11. In the periscopic optics form 230 the image sensor tube 46 is rotated corresponding to tilting movements of the lateral body portion 234 and weapon-optics combination 42 in generally the same way that this was done in the second optics form of FIGS. 10 and 11. This is illustrated schematically for the third optics form in FIG. 14. Referring to FIG. 14, start point 248 designates the forward, horizontal position of the axis of the weapon-optics combination 42 (hereinafter referred to in the present discussion as simply the scope axis), this being the position of FIG. 12 and the right-hand phantom line position of FIG. 13. The arcuate arrow 250 designates the first 90° of tilting movement of the scope axis from start point 248 to the vertical position designated 251, which is the solid line position of FIG. 13. The 90° arcuate line 252 indicates rotational movement of the image sensor tube 46 in the opposite direction from start point 248 simultaneously with the tilting movement of the scope axis through its first 90° arc 250. The tilting movement of the scope axis and rotational movement of the image sensor are opposite to each other during their respective first 90° arcs 250 and 252, respectively, in the sense that the transverse pivot axis 236 about which the scope axis tilts and the image sensor axis are considered to be a single straight-line axis. When the scope axis reaches its 90° position 251, the image sensor reaches its opposite 90° position 253.

Arcuate arrow 254 indicates the second 90° of tilting movement of the scope axis from the vertical point 251 to the 180° tilted position designated 255, which is the rearwardly directed position. During this second 90° tilting movement 254 of the scope axis, the image sensor is rotated in the same direction as the scope axis is being tilted, the image sensor being rotated back from its 90° position 253 through the arc 256 to the start point 248.

Means for reversing the rotational movement of the image sensor tube at the 90° point 253 is illustrated in the wiring diagram portion of FIG. 14, which shows a circuit arrangement including the stepper motor 258 which rotationally drives the image sensor tube 46 in synchronism with the motor which tiltingly drives the weapon-forward optics combination 42. The circuit portion of FIG. 14 shows a double pole-double throw reversing switch arrangement 260 that is actuated at the 90° point 253 to change the direction of rotation of the image sensor drive motor 258.

As the scope axis passes from its first 90° arc 250 through the point 251 into the second 90° arc 254, the image presented at the control console 26 would become inverted unless further compensation were provided. As with the second optics form of FIGS. 10 and 11, such compensation may be applied by simply reversing the polarity of the magnetic yoke coil of image sensor tube 46 when the image sensor tube reaches the rotation point 253. This is also diagrammatically illustrated in the circuit diagram portion of FIG. 14, wherein the magnetic yoke coil 261 is connected so that coil and motor reversals are simultaneously effected.

As the scope axis returns forwardly from the 90° arc 254 through the point 251 and thence into the forward 90° arc 250, the image sensor unit rotation is simply reversed from that previously described, the image sensor unit first rotating from the start point 248 through the arc 256 to the 90° point 253, at which point the switching means 260 reverses the motor 258 and flips the direction of magnetic coil 261, and the unit then rotates back through the arc 252 from the point 253 to the starting point 248, which it reaches when the scope axis has again reached the start point 248.

FIG. 15 illustrates the image sensor-optics combination in a linear, coaxial arrangement wherein the focal planes are diagrammatically illustrated. Thus, the optics include field lens 262, reticle lens 264, and objective lens 266, which constitutes conventional scope optics. The image sensor unit 46 is axially aligned with these three scope lenses, being disposed behind the field lens 262. The light lines diagrammatically illustrate by convergence thereof to a point that there are two focal planes in this optical system, a first focal plane being centered in the reticle lens 264, and a second focal plane being in the image sensor unit 46 proximate its forward face 268. This illustrates that the reticle patterns in the present system can be alternatively disposed either in the center of the reticle lens 264 or proximate the forward face 268 of the image sensor unit 46. FIG. 16 illustrates the image sensor tube 46 with the reticle patterns 270 proximate its forward face 268. The reticle patterns 270 can either be on the outer glass surface of the image sensor, or on the inner, focal plane face, the latter positioning providing the sharper reticle image at the console 26.

While the image sensor-scope optics are shown in a linear arrangement in FIG. 15, this is simply for illustrative purposes to indicate the focal planes at which the reticle patterns may be placed. The single light deflections in the optics forms shown in FIGS. 8 to 11, and the double light deflection in the form shown in FIGS. 12 and 13 do not change the positioning of the recticle patterns in the optical system, the reticle patterns still being alternatively disposable either in the reticle lens or proximate the face of the image sensor unit.

Referring now to FIGS. 17 to 20 of the drawings, these figures illustrate a mobile unit 28 embodying a second form of transport system which includes a periscopic optics form like that diagrammatically illustrated in FIGS. 12 to 14, and includes the compact weapon form that is illustrated in FIGS. 29 to 32 of the drawings and described in detail hereinafter in connection with those figures.

Figure 17:
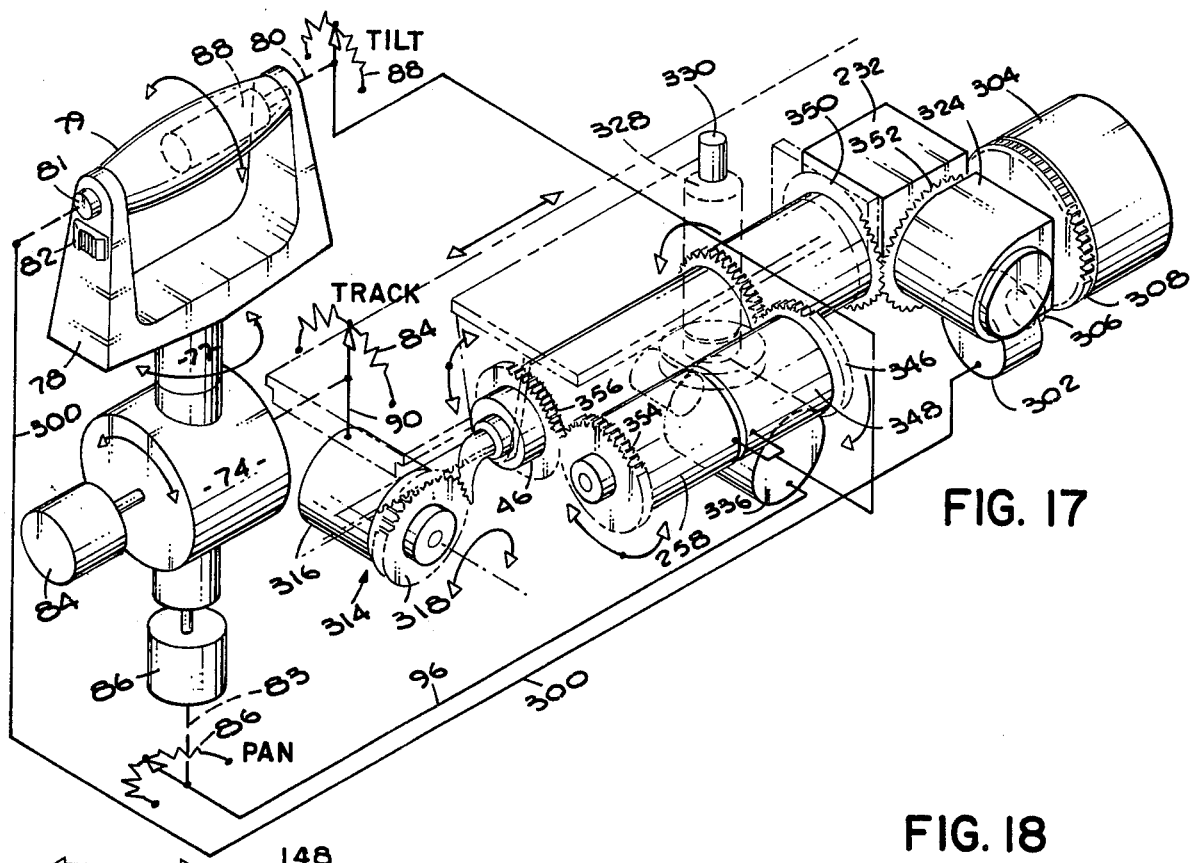
FIG. 17 is a schematic isometric view illustrating a second form of remote mobile unit with operative connections to the manual control unit of the console, the mobile unit of FIG. 17 employing the periscopic optics form illustrated in FIGS. 12, 13 and 14.
Figure 18:
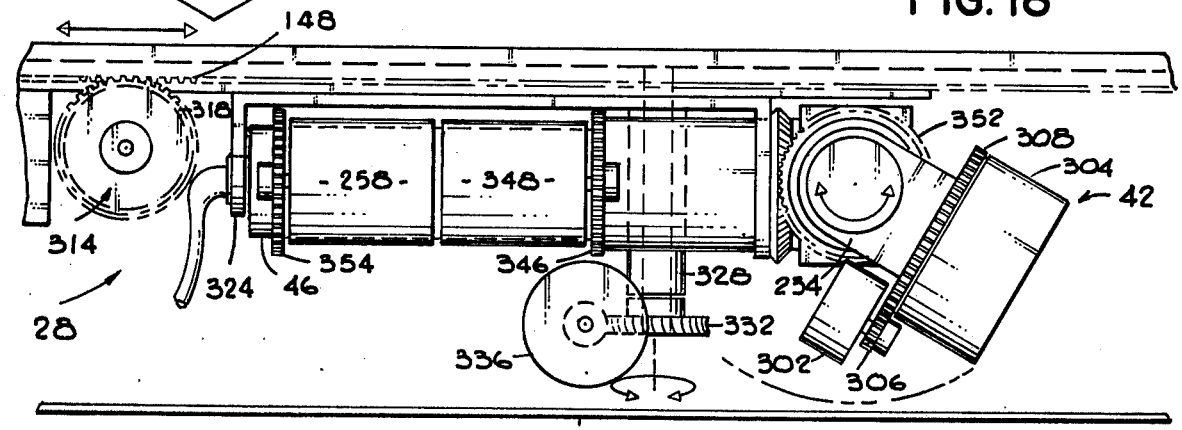
FIG. 18 is a side elevational view of the mobile unit shown in FIG. 17.
Figure 19:
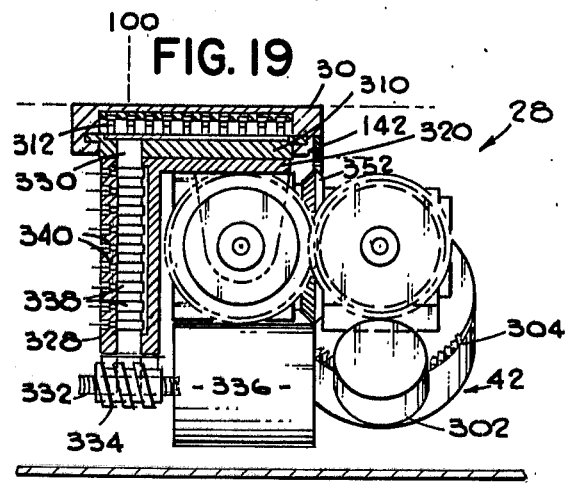
FIG. 19 is a rear end elevational view of the mobile unit shown in FIGS. 17 and 18, with portions illustrated in transverse, vertical section.
Figure 20:
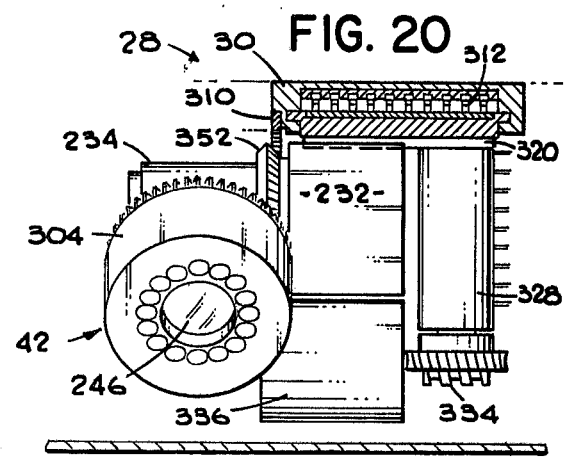
FIG. 20 is a front end elevational view of the mobile unit shown in FIGS. 17 to 19, with portions illustrated in transverse, vertical section.

In order to correlate the second transport system of FIGS. 17 to 20 with the manual control unit 70 at control console 26, and also to correlate the second transport system of FIGS. 17 to 20 with the first transport system shown in FIGS. 6 and 7, the schematic illustration in FIG. 17 has been provided which shows both the transport system and the manual control unit, as well as connections therebetween. The manual control unit 70 is illustrated in FIG. 17 in substantially the same way that it is illustrated in FIG. 5, including the various movable portions thereof at their respective linear, pan and tilt controllers which are illustrated as potentiometers. Inasmuch as the manual control unit 70 has been described hereinabove in detail in connection with FIG. 5, the various elements of the manual control unit 70 and their functions and modes of operation need not be repeated in connection with FIG. 7.

One additional conductor from the manual control unit 70 is illustrated in FIG. 17, namely, conductor 300 from the trigger 81 to weapon drive motor 302 which drives the weapon 304 through a spur gear 306 on the motor shaft and a ring gear 308 on the weapon. For convenience, the weapon-forward optics combination will, in the present description relating to FIGS. 17 to 20, be designated by the reference numeral 42, as before. Similarly, for convenience in understanding the structure and mode of operation of the periscopic optics embodied in the form of the system shown in FIGS. 17 to 20, the same reference numerals will be utilized in FIGS. 17 to 20 as those employed in the corresponding periscopic optics form 230 shown in FIGS. 12 to 14 and described in detail in connection therewith.

It is also to be noted that the form of transport system shown in FIGS. 17 to 20 employs encoders and encoder gears generally similar to those employed in the form of transport system illustrated in FIGS. 6 and 7, and accordingly, so as to simplify the drawings, the encoders and related encoder gears are not duplicated in FIGS. 17 to 20.

The mobile unit that is shown in FIGS. 17 to 20 includes a car or traveling base 310 which moves longitudinally along the track 30, and has insulatively supported thereon sliding contact wiper means 312 similar to that shown in FIGS. 6 and 7. The lineal or track drive is generally designated 314, and consists of track motor 316 driving a spur gear 318 along the rack 148. This lineal or track drive may, alternatively, be a worm-type drive like that shown in FIGS. 6 and 7.

Yoke body 320 is pivotally supported on the car or traveling base 310 for panning movements about the pan axis 100. Yoke body 320 includes an elongated base portion 322 having depending end flanges 324 and 326 at its rearward and forward ends, respectively. An integral depending hub 328 on yoke body 320 is pivotally engaged over a fixed vertical post 330 which depends from a fixed mounting thereof in the car 310, the vertical post 330 defining the pan axis 100. Worm gear 332 is fixedly disposed on the lower, free end of the fixed vertical post 330, and is engaged by a worm 334 that is driven by pan motor 336 supported on the yoke body 320 to provide panning movements of the yoke body 320 and the various members supported thereon about the pan axis 100.

A plurality of spaced electrical contact rings 338 are insulatively supported on the fixed vertical post 330 and are connected through the post 330 to contact wipers of the sliding contact wiper means 312. A plurality of respective contact wipers 340 are insulatively supported in the depending hub 328 of yoke body 320 in electrical wiping contact with the contact ring 338 to provide the required electrical connections to the yoke-supported mechanisms.

The image sensor unit 46 is generally longitudinally supported relative to the yoke body 320 between the depending end flanges 324 and 326 of the yoke body, the image sensor 46 being rotatable or pivotal about its own central axis. Concentrically mounted around the forward portion of the image sensor unit 46 is a tubular housing 342 which is supported for rotational movement independent of the rotational movement of the image sensor unit 46. The tubular housing 342 has a ring gear 344 thereon proximate its rearward end, the ring gear 344 being driven by a spur gear 346 which in turn is driven by tilt stepper motor 348 supported on the yoke body 320.

The tubular housing 342 has a bevel drive gear 350 thereon proximate its forward end, the bevel gear 350 driving a bevel gear 352 on the lateral body portion 234 of the periscopic optics arrangement. Accordingly, the tilt stepper motor 348 is operatively connected to apply tilting movements to the lateral body portion 234 of the periscopic optics arrangement through spur gear 346, ring gear 344, tubular housing 342, and bevel gears 350 and 352.

The image sensor stepper motor 258, which is diagrammatically illustrated in FIG. 14, is supported on yoke body 320 adjacent to the tilt stepper motor 348. Image sensor stepper motor 258 rotatably drives the image sensor unit 46 through a spur gear 354 on the stepper motor shaft and a ring gear 356 on the image sensor unit 46.

The tilt stepper motor 348 and image sensor stepper motor 258 are correlated through switching means like the switching means 260 diagrammatically illustrated in FIG. 14 so as to define the relative tilting and rotational movements described in detail in connection with FIG. 14 as between the combination 42 of weapon 304 and forward optics 246 on the one hand and the image sensor unit 46 on the other hand.

As illustrated in FIG. 17, the linear or track controller 84 of manual control unit 70 is operatively connected through conductor 90 to the linear or track motor 316; the pan controller 86 of manual control unit 70 is operatively connected through conductor 96 to the pan motor 336; and the tilt controller 88 of manual control unit 70 is operatively connected through conductor 102 to the tilt stepper motor 348 and to the image sensor unit stepper motor 258 for coordinated stepper movements of the stepper motors 348 and 258 pursuant to the diagrammatic illustration of FIG. 14 and the detailed description hereinabove relating to FIG. 14.

Accordingly, forward-rearward movement of control handle 79 and yoke 78 of control unit 70 about horizontal, transverse axis 76 will energize track motor 316 to drive the mobile unit 28 of FIGS. 17 to 20 lineally along the track 30. Pivotal movement of the control handle 79 and yoke 78 about pivot axis 83 will energize the pan motor 336 to cause corresponding pan movement of the yoke body 320 and hence of the weapon-optics combination 42 about its pan axis 100. Pivoting or rotational movement of the control handle 79 per se about its pivot axis 80 in yoke 78 will cause energization of the tilt stepper motor 348 to cause corresponding tilting movement of the lateral optics body portion 234 and the weapon-forward optics combination 42 about the transverse pivot axis 236; and will also result in coordinated energization of the image sensor unit stepper motor 258, including appropriate switching for reversal of the image sensor motor 258 and image sensor magnetic yoke coil 261 upon passage of the scope axis through the vertical position.

Figure 21:
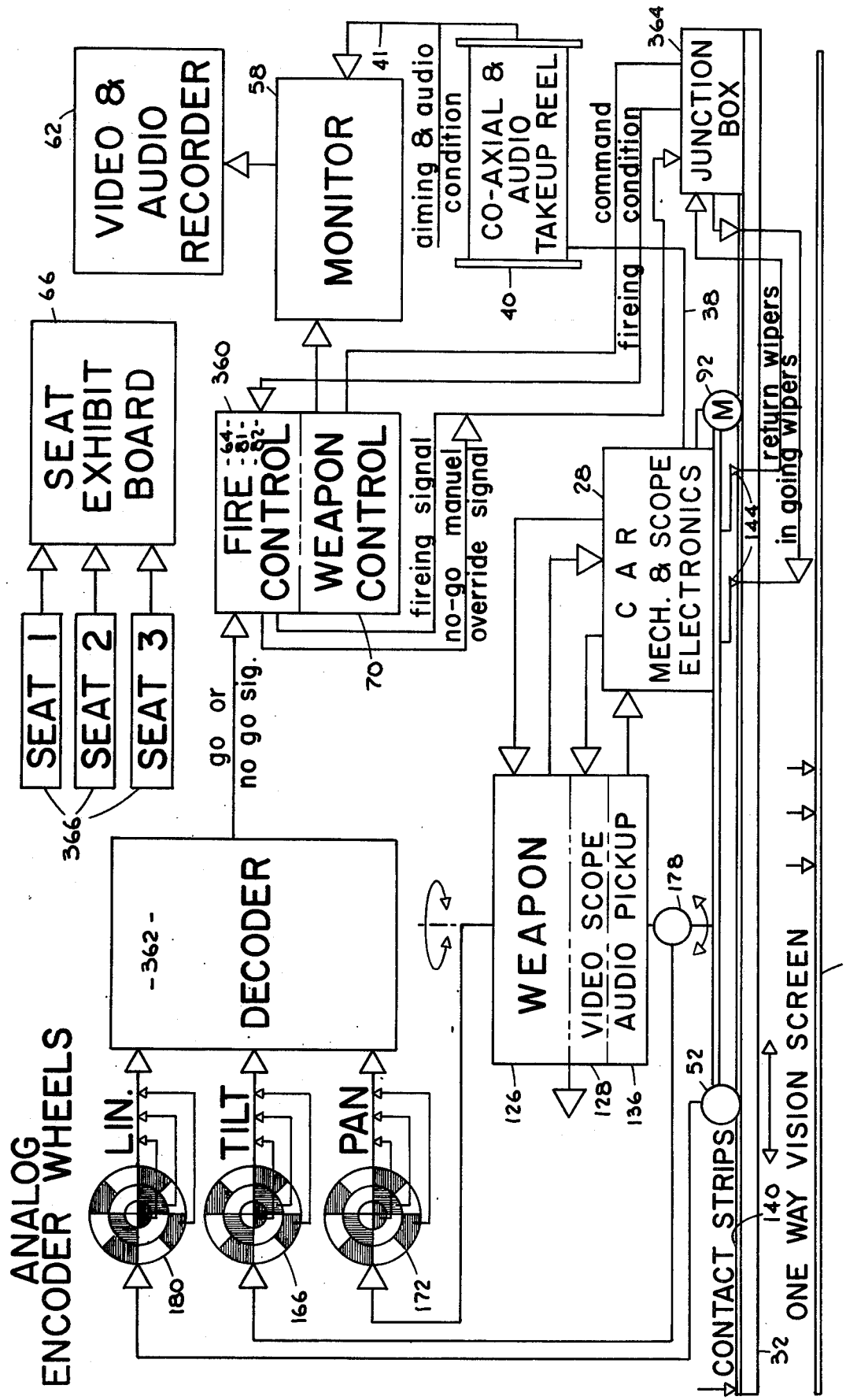
FIG. 21 is a block diagram of a complete surveillance and weapon system in accordance with the present invention.

FIG. 21 illustrates, in block diagram form, the general system of the present invention, including the major components thereof, in a form of the invention adapted as an anti-hijacking system for commercial airplanes. For convenience in relating the components illustrated in FIG. 21 with corresponding components shown pictorially and in more structural detail in other figures of the drawings, some of the reference numerals employed in FIG. 1 are the same reference numerals employed for similar elements in other figures of the drawings. In particular, a number of the elements of FIG. 21 are numbered the same as corresponding elements in FIGS. 1 and 5 to 7.

Components of the surveillance and control console 26 that are illustrated in FIG. 21 include video surveillance screen 58, video and audio recorder 62, and the block 360 designated "fire control", which includes as elements thereof the fire control panel 64, trigger 81, and safety 82.

Also included in the console 26 is decoder 362 forming a part of the inhibit system. The decoder 362 is continuously fed go/no-go binary signals from the linear, tilt and pan encoder wheels 180, 166 and 172, which are respectively actuated on mobile unit 28 by linear encoder gear 52, pan encoder gear 170, and weapon tilt shaft 178. The decoder 362 is in the nature of a small computer that is wired to provide a no-go output signal when all three of the encoder wheels 180, 166, and 172 line up in the no-go condition. For any other array of the three individual encoder wheels 180, 166 and 172, the decoder will provide a go output signal, as for example if any one of the three encoder wheels 187, 166 and 172 is in the go condition.

The decoder 362 will be programmed differently for each different type of commercial airplane, and also for different passenger compartment and seating arrangements even on the same type of airplane, so as to define the no-go areas for each type of aircraft and for various seating and compartment arrangements.

The no-go areas defined by the decoder 362 are those areas of the aircraft wherein critical structural damage is likely to occur if the weapon were fired.

Although the connection from the encoder wheels 180, 166 and 172 to the decoder 362 are diagrammatically illustrated in FIG. 21 as direct connections to the decoder, in practice these connections will normally be through the track conductors to a junction box 364 near the console 26, and thence to the decoder 362 in the console 26.

The output go/no-go signal from the decoder is fed to the fire control part 360 of the system. A firing signal from trigger 81 is fed from fire control 360 to junction box 364 for transmission to the weapon, provided that a go signal is then being received by fire control 360 from decoder 362. Nevertheless, a manual override signal can be provided from fire control 360 so as to override the no-go signal from decoder 362, and thereby provide a firing override signal to the junction box 364.

The weapon control block 70 on the diagram of FIG. 21 represents the manual control unit 70, which provides movement commands to the junction box 364 and thence to the mobile unit 28.

A further component of the control illustrated in FIG. 21 is seat exhibit board 66, which is wired to the seats 366 in the passenger compartment so that switching means in the individual seats 366 will indicate by lighting means on seat exhibit board 66 whenever an individual seat or one of a particular group of seats is vacated.

The coaxial and audio take-up reel 40 is shown in FIG. 21, providing spring-biased take-up of the cable 38 extending to mobile unit 28, and being connected through cable 41 to the video surveillance screen 58, and to the video and audio recorder 62.

Referring now to the lower portion of FIG. 21, the mobile unit 28 is illustrated as being driven on track 30 by means of linear motor 92, the track 30 and mobile unit 28 being disposed above the one-way vision screen 32. Contact strips 140 longitudinally arranged along the track 30 are slidably engaged by the contact wipers 144 on mobile unit 28, the contact wipers 144 including both ingoing wipers and return wipers.

Although the track contact strips 140 and mobile unit contact wipers 144 are shown and described in detail herein as the principal electrical connection means from the control console 26 and junction box 364 to the mobile unit 28, it is to be understood that other electrical connection means may be employed within the scope of the invention as for example a helix stretch coil similar to that employed to connect telephone handset and base units.

Also shown in FIG. 21 as components of the mobile unit 28 are the weapon 126, video scope 128 comprising both optical scope and video image sensor, and audio pickup 136.

Sheets 6, 7 and 8 of the drawings respectively illustrate first, second and third weapon forms according to the present invention wherein the weapons per se, including both firing mechanisms and barrels, are of tubular, generally annular configuration having a central axial throat within which at least the forward portion of the optical scope is mounted. In both the first weapon form shown in FIGS. 22 to 26 on sheet 6, and the second weapon form shown in FIGS. 27 and 28 on sheet 7, the optical scope and electronic image sensor are linearly, coaxially arranged in the weapon throat. In the third weapon form illustrated in FIGS. 30 to 32, just the optical scope is disposed in the throat of the weapon; and in the diagrammatic illustration of the third weapon form in FIG. 32, only the objective and reticle lenses forming a forward portion of the optics are disposed in the weapon throat.

Referring now to the first weapon form as illustrated in FIGS. 22 to 26, in addition to being adapted to receive the optical scope and electronic image sensor in linear arrangement in the throat thereof, this first weapon form is characterized by the further features of being pre-cocked, embodying a separate stepper motor rather than having the motor integrated therein; and firing a double helix pattern. These and other features of the first weapon form will become more apparent from the following detailed description thereof in connection with FIGS. 22 to 26.

The first weapon form is generally designated 390. Forming a stationary external structural portion of the weapon 390 is rear bearing thrust plate 392, which may be utilized as a fixed base member for mounting of the weapon 390. The thrust plate 392 has an opening 394 therein through which the image sensor focus adjuster 134 is threadedly engaged, the adjuster 134 being coupled at its inner end to adjust plates 396 on the image sensor unit 46.

The outer periphery of the rear bearing thrust plate 392 has a forwardly directed cylindrical flange 398 thereon; while the inner periphery of the thrust plate 392 has a rearwardly directed tubular housing portion 400 thereon that terminates in an in-turned flange 402. The tubular housing portion 400 houses the rearward portion of the electronic image sensor unit 46, and sealing is provided by means of a resilient grommet 404 supported in the in-turned flange 402 through which the cable section 132 extends.

Stepper motor 408 is supported on the rear bearing thrust plate 392 and drives the weapon 390 by means of a pinion 410 on the motor output shaft.

An annular backup plate 412 is positioned forwardly of the thrust plate 392 as a backing for fire pin springs 414. The backup plate 412 includes an axial portion 416 which abuts against the thrust plate 392, and a radial portion 418. Elongated, generally cylindrical fire pin housing 420 abuts against and extends forwardly from the radial portion 418 of backup plate 412.

The rear bearing thrust plate 392, spring backup plate 412 and fire pin housing 420 are all stationary parts of the weapon 390, and are secured together by means of a plurality of machine screws 422.

A further stationary portion of the weapon 390 is central body member 424 which is fixedly engaged in the fire pin housing 420 as a forward extension of the fire pin housing 420. The central body member 424 includes a generally cylindrical image sensor unit support portion 426, and it will be seen from FIG. 22 that the body of the image sensor unit 46 is completely supported within the fire pin housing 420 and the support portion 426 of the body member 424.

The body member 424 also includes a radially outwardly extending shell backup portion 428 having a regularly spaced series of rearwardly opening fire pin recesses 430 therein. In the weapon form 390 as illustrated in FIGS. 22 to 26 there are sixteen of these fire pin recesses 430 regularly spaced about the shell backup portion 428 of body member 424. Each of the fire pin recesses 430 terminates in a fire pin hole 432 through which the forward tip of a respective fire pin is adapted to project for energizing a respective shell.

The central body member 424 also includes generally cylindrical, forwardly extending annular portion 434 which cooperates with the forward part of the cylindrical portion 426 in supporting the barrel body as hereinafter described. The generally cylindrical inner portion 426 of the body member 424 terminates in a stepped forward portion 436.

An annular sponge cushion 438 is disposed between the forward face of image sensor 46 and the stepped forward portion 436 of body member 424, the sponge cushion 438 allowing for focusing adjustment of the image sensor unit 46 axially in the throat of the weapon 390, and also cushioning the image sensor unit 46 against recoil shock.

The field lens 262, reticle lens 264 and objective lens 266 are mounted stepped lens housing 440, the forward portion of which is coaxially supported within generally annular barrel body 442, and the rearward portion of which is engaged in the stepped forward portion 436 of central body member 424.

The barrel body 442 is of generally cylindrical configuration, and has a series of barrels 444 regularly spaced about the annulus. In the weapon form 390 that is illustrated there are sixteen of the barrels 444 regularly spaced about the barrel body 442.

The barrel body 442 is also a stationary part of the weapon 390, the barrel body 442 being supported on the central body member 424 by engagement of the rearward end portion of barrel body 442 over the forward part of the generally cylindrical portion 426 of body member 424 and within the external annular portion 434 of body member 424. The barrel body 442 is releasably retained in this operative position by means of a plurality of external fastening lugs 446 on the barrel body 442 which are engaged by corresponding release latches 448 of the overcenter toggle type which are pivotally connected to the external annular portion 434 of body member 424 in respective grooves or cutouts 450 therein.

The release latches 448 permit disassembly of the barrel body 442 from the central body member 424 for removal of empty shells and reloading. With the barrel body 442 removed from central body member 424, re-cocking of the firing pins may, if desired, be accomplished by access thereto through the fire pin holes 432; or, alternatively, re-cocking of the fire pins may involve forward separation of the central body member 424 from the fire pin housing 420.

A generally cylindrical annular fire pin release ring 452 is rotatably mounted on needle bearings 454 about the fire pin housing 420, and has an integral internal ring gear 456 at its rear end engaged by stepper motor drive pinion 410. Rear thrust bearing 458 engaged between the rear end of release ring 452 and thrust plate 392 applies the firing thrust of the weapon to the thrust plate 392, and a suitable O-ring seal 460 is engaged between the ring 452 and flange 398 of thrust plate 392. Front thrust bearing 462 engaged between the shell backup portion 428 of central body member 424 and the forward portion of fire pin release ring 452 applies the firing thrust to the release ring 452. Another O-ring seal 464 is engaged between body portion 428 and overlapping forward skirt 465 of fire pin release ring 452.

The fire pin release ring 452 includes a shallow radially inwardly directed release flange 466 which has a pair of diametrically opposed, arcuate release cutouts 468 therein. As illustrated in FIGS. 24 and 25, each of these diametrically opposed or 180° separated release cutouts 468 is of inclined configuration, having a generally rearwardly facing inclined lead-in ramp 470 and a generally forwardly facing cam ramp 472, the ramps 470 and 472 cooperating to permit positive rapid-fire actuation of the fire pins.

The fire pins are each generally designated 474, and include a shank or body portion 476, a flange portion 478 at the forward end of the shank portion 476, and a forwardly projecting percussion tip 480 adapted upon release of a respective fire pin 474 to project through a respective fire pin hole 320 into percussive engagement with a cartridge or shell 482 to energize the latter. For smooth release of the fire pins 474 each of the fire pins is forwardly biased by its respective fire pin spring 414 through a ball bearing 484.

In the form of the weapon 390 illustrated in FIGS. 22 to 26, there are sixteen of the fire pins 474 axially aligned with the respective sixteen barrels 444. In the normal operative condition of the weapon 390, all sixteen of the fire pins 474 are pre-cocked and are retained by engagement of the flange portions 478 of the fire pins 474 against the rearwardly facing shoulder presented by the release flange 466 forming a part of the fire pin release ring 452. In such condition of weapon 390, the diametrically opposed release cutouts 468 in the release flange 466 are circumferentially offset from the diametrically opposed pairs of fire pins 474 located adjacent thereto. A single firing actuation of the weapon 390 is caused by energization of stepper motor 408 to rotationally drive the fire pin release ring 452 through motor drive pinion 410 and ring gear 456 in the release ring 452, so as to step the release cutouts 468 into registry with a diametrically opposed pair of fire pins 474 as illustrated in FIG. 23 so as to simultaneously release such pair of fire pins 474 and thereby simultaneously fire the pair of shells 482 aligned therewith. Such single actuation of the weapon 390 includes sufficient rotational stepping movement of the fire pin release ring 452 to permit the flange portions 478 of the pair of opposed fire pins 474 to ride down the lead-in ramps 470 of release cutouts 468 from the position shown in FIG. 24 to the position shown in FIG. 25.

A second actuation of the weapon 390 is caused by a second stepping movement of stepper motor 408 to cause a second rotational step of fire pin release ring 452 to move the diametrically opposed release cutouts 468 into registry with a second diametrically opposed pair of fire pins 474 adjacent to the first pair of fire pins 474 already released. In this manner successive actuations of the weapon 390 are accomplished by successive stepping energizations of the stepper motor 408. Firing can be either semiautomatic wherein opposed pairs of shells 482 are sequentially fired at the discretion of the operator; or can be fully automatic wherein the successive opposed pairs of shells 482 are fired in sequence until all eight pairs of shells 482 have been fired. The inclined ramps 470 and 472 of release cutouts 468 cooperate to permit rapid semiautomatic or fully automatic firing of the weapon 390. Since the barrel body 442 is stationary and the opposed pairs of shells 482 are fired in circumferential sequencing about the barrel body 442, the firing is in a double helix pattern. Because each firing actuation of weapon 390 results in simultaneous firing of diametrically opposed pairs of shells 482, recoil torque is cancelled out and the effect of recoil is axially centered in the weapon.

While mounting of the weapon form 390 may be by suitable attachment to the rear bearing thrust plate 392 as indicated hereinabove, a more centralized mounting may be by attachment to the external annular portion 434 of the central body member 424.

Referring now to FIGS. 27 and 28 of the drawings, these figures illustrate in detail a second weapon form generally designated 126 which is in the form illustrated in the transport or mobile unit 28 shown in FIGS. 6 and 7 of the drawings. The second weapon form 126, like the first weapon form 390 shown in FIGS. 22 to 26, is of the linear type, wherein the scope optics and image sensor tube are adapted to be arranged coaxially in tandem with the throat of the weapon. However, the second weapon form 126 differs from the first weapon form 390 in a number of important aspects relating to both structure and mode of operation. Thus, the second weapon form 126 is self-cocking during operation, rather being pre-cocked as is the first weapon form 390. The second weapon form 126 utilizes a pair of diametrically opposed firing pins that are rotationally stationary, remaining generally on the same diametric plane, and the barrel body is rotationally-indexed between successive diametrically opposed pairs of barrels, so as to produce a planar, 180° firing pattern, as compared with the double helix firing pattern of the first form 390. A further difference is that the second weapon form 126 has a self-contained 180° increment motor, whereas the first weapon form 390 has a separate increment motor coupled thereto which drives the weapon in much smaller angular increments for successive firings.

Referring now in detail to FIGS. 27 and 28, the second weapon form 126 includes an elongated, tubular, inner body 502. A generally annular rear external housing 130 includes a first reduced rearward portion 504 within which the rearward end portion of the tubular inner body 502 is seated. The external housing 130 and inner body 502 are non-rotational members, the external body 130 being adapted to have mounting means connected thereto as indicated in FIGS. 6 and 7 of the drawings.

The image sensor unit 46 has its main body portion mounted within the tubular inner body 502, and its reduced rearward portion extends rearwardly through the first reduced rearward portion 504 of housing 130 and then through a second reduced rearward portion 506 of housing 130. A rear end cap 508 on the housing portion 506 has a resilient grommet 510 mounted therein through which the rear end portion of image sensor tube 46 projects.

The flat front end of image sensor tube 46 seats against annular sponge cushion 512, which in turn seats against positioning flange 514 extending radially inwardly from the tubular body 502. Focus adjuster 134 is threadedly engaged through the rear end cap 508 and rotatably connected to the image sensor unit 46 to provide axial and hence focusing adjustment of the image sensor unit 46 against the resiliency of the annular sponge cushion 512.

A stepped lens housing 516 is supported within the tubular inner body 502 forwardly of the positioning flange 514, and supports an axial scope arrangement similar to that shown in FIG. 15, including field, reticle and objective lenses 262, 264 and 266, respectively.

The driving motor for the second weapon form 126 is self-contained within the housing 130, and includes a generally ring-shaped stator portion 520 fixedly mounted in the housing 130, and a generally ring-shaped rotor portion 522 concentrically spaced within the stator portion 520 and mounted on a tubular cam sleeve 524, the rotor 522 and cam sleeve 524 being rotatable as a unit between the external housing 130 and stator 520 on the outside and the tubular inner body 502 on the inside. The rotor portion 522 of the motor has a commutator 526 circumferentially mounted on the outside thereof, and suitable brushes 528 are mounted on the stator portion 520 of the motor in engagement with the commutator 526.

The cam sleeve 524 has an inner generally cylindrical portion 530 that is rotatable about tubular inner body 502 on needle bearings 532 for freedom of movement, with rear thrust bearing 534 being interposed between the inner portion 530 of cam sleeve 524 and a reduced portion of external housing 130.

A radial portion 536 extends radially outwardly from the inner portion 530 of cam sleeve 524 and terminates at an outer tubular portion 538 of cam sleeve 524, the outer portion 538 having therein a pair of diametrically opposed, symmetrical, rearwardly facing cam firing ramps 540. The ramps 540 are each of generally semihelical configuration, commencing at diametrically opposed forward lead-in ends 542 and extending rearwardly and circumferentially to diametrically opposed rearward release ends 543. The cam firing ramps 540 each extend somewhat less than 180° circumferentially so as to define a circumferential space between the rearward release end 543 of each ramp 540 and the forward lead-in end 542 of the other ramp 540; such circumferential space being further defined by an axially arranged guide shoulder 544 aligned with and spaced rearwardly from each of the ramp lead-in ends 542. Thus, a pair of diametrically opposed guide slots 545 is defined within the outer tubular portion 538 of cam sleeve 524 between the rearward release ends 543 of the ramps 540 on the one hand and the forward lead-in ends 542 and guide shoulders 544 on the other hand.

A shell backup plate 546 is rotatably supported on the tubular inner body 502 forward of the generally cylindrical inner portion 530 of cam sleeve 524, and thrust bearing 547 is interposed between backup plate 546 and the front end of inner portion 530 of cam sleeve 524. The shell backup plate 546 is rotationally movable as a unit with the barrel body.

A front external housing 548 is fixedly secured to and extends forwardly from the rear external housing 130. Axially, but not rotationally, slidable within this front external housing 548 is firing pin sleeve 550, which includes an inner rear flange 552 upon which a pair of diametrically opposed, forwardly projecting firing pins 554 are fixedly mounted. The shell backup plate 546 has a series of regularly spaced fire pin holes 556 therein (sixteen in number in the illustrated embodiment) which are aligned with the respective barrels of the weapon, and the two 180°-apart firing pins 554 are adapted upon release of the firing pin sleeve 550 to project through a diametrically opposed pair of the fire pin holes 556 to energize a pair of shells located in diametrically opposed barrels of the weapon.

The firing pin sleeve 550 includes an outwardly directed front flange 558 that rides in the front housing 548. The firing pin sleeve 550 also is axially slidable in a split ring 560 which is seated within the rearward end of front housing 548 and which is fixed against rotation by engagement of a pair of diametrically opposed outer ears 562 thereon in a pair of respective recesses 564 in the housing 548. A pair of diametrically opposed inner ears 566 on the split ring 560 are engaged in diametrically opposed axial slots 568 in the firing pin sleeve 550 to secure firing pin sleeve against rotational movement within the housing 130–548, while nevertheless allowing axial sliding movement of the firing pin 550.

The firing pin sleeve 550 is actuated axially by rotational movements of the cam sleeve 524 through a pair of diametrically opposed firing lugs 570 on the outside of firing pin sleeve 550 proximate its rear end. The firing pin sleeve 550 is biased forwardly by a helical compression spring that is disposed in the radial direction between the outside of firing pin sleeve 550 and the inside of housing 548, and is engaged in the axial direction between the front flange 558 on firing pin sleeve 550 and the split ring 560.

Upon completion of a single firing cycle, the firing lugs are located in the respective diametrically opposed guide slots 545 in cam sleeve 524. A firing cycle involves a 180° anticlockwise increment movement (as viewed in FIGS. 27 and 28) of rotor 522 and cam sleeve 524 relative to the rotationally stationary firing pin sleeve 550. During such 180° increment movement, the firing lugs 570 ride up along the cam firing ramps 540 from the lead-in ends 542 to the release ends 543, during which the entire firing pin sleeve 550 is retracted rearwardly against the biasing force of spring 572, and when the firing lugs 570 move off of the release ends 543 of the ramps 540 the lugs 570 are released into the guide slots 545, whereupon the firing spring 572 drives the firing pin sleeve 550 forwardly and the firing pins 554 energize a pair of diametrically opposed shells in the barrel body.

The barrel body is generally designated 574, and has a series of regularly spaced, parallel barrels 576 extending longitudinally therethrough, there being sixteen of the barrels 576 in the form illustrated in FIGS. 27 and 28. An annular retainer plate 578 is disposed in front of the barrel body 574, the plate 578 having a regularly spaced series of bores 550 therethrough which line up with the respective barrels 576. The retainer plate 578 is releasably secured to the front end of housing 548 by a plurality of release latches 582 of the overcenter type. In this manner the barrel body 574 is held axially in position about the tubuler inner body 502 and within the firing pin sleeve 550, but the barrel 574 is easily removable from this operative position for reloading by release of the latches 582.

The barrel body 574 is rotationally movable and indexable in this operative position relative to the rotationally stationary tubular inner body 502, firing pin sleeve 550 and external housing 548. A barrel aligning ring 584 is rotationally fixed in the front end of housing 548 and in retainer plate 578, the ring 584 having a pair of small, diametrically opposed radial bores 586 therein within which respective ball detents 588 and detent biasing springs 590 are mounted. The detents 588 are releasably engageable in a series of external detent grooves 592 regularly spaced about the forward peripheral portion of barrel body 574, each of the detent grooves 592 corresponding to a respective barrel 576. The diametrically opposed barrel indexing detents 588 engage in respective diametrically opposed barrel detent grooves 592 to assist in the final indexing of a pair of diametrically opposed barrels 576 in the firing plane.

Primary barrel indexing is accomplished by means of a pair of diametrically opposed barrel indexing pins 594 affixed in firing pin sleeve 550 and projecting inwardly therefrom, the barrel indexing pins 594 being engaged in a diametrically opposed pair of barrel indexing grooves 596 located in the rearward peripheral portion of the barrel body 574. A regularly spaced, communicating series of these barrel indexing grooves 596, corresponding in number to the number of barrels 576, is arranged about the barrel body 574, and each of these barrel indexing grooves 596 includes a respective primary inclined barrel shifting portion 598, an axial release portion 600, a secondary inclined barrel shifting portion 602, and a fire indexing portion 604.

During each firing cycle wherein the cam sleeve 524 rotates anticlockwise through a 180° stepping movement as viewed in FIGS. 27 and 28, as the ramps 540 draw the lugs 570 and sleeve 550 rearwardly, the barrel indexing pins 594 move rearwardly from a pair of opposed fire indexing groove portions 604 into the respective adjoining inclined groove portions 598, shifting the barrel body anticlockwise as viewed in FIGS. 27 and 28 as the pins 594 pass upwardly through the inclined groove portions 598, and then as the firing lugs 570 approach the release ends 543 of the ramps the indexing pins 594 engage in the corresponding axial release portions 600 of the indexing grooves. Then, when the lugs 570 are released into the guide slots 545, the indexing pins 594 ride forwardly in the axial groove portions 600, cause a final indexing movement of the barrel body as they pass forwardly through the secondary inclined groove portions 602, and finally enter the fire indexing portions 604 of the grooves at the time the firing pins 554 energize the shells in the corresponding pair of opposed barrels 576. It will be seen that for each such 180° stepping rotational movement of the cam sleeve 524, a fresh pair of barrels 576 will be indexed into alignment with the firing pins 554, adjacent to the pair of barrels last fired. In this manner, the barrels that are fired will always be located on the same plane relative to the weapon, so that a planar, 180° firing pattern will result. This effectively cancels out recoil torque relative to the axis of the weapon.

The third weapon form 304 illustrated in detail in FIGS. 29 to 31 of the drawings is the weapon form illustrated in connection with the mobile unit in FIGS. 17 to 20. The weapon form 304 of FIGS. 29 to 31 is similar to the first weapon form shown in FIGS. 22 to 26 in that it is pre-cocked, it fires a double helix pattern, and it is adapted to be driven by separate stepper motor. However, this third weapon differs from the first and second weapon forms in that it is very compact, being adapted for a non-linear configuration wherein the optical scope or a portion thereof only is coaxially located in the throat of the weapon 304, and the electronic image sensor is external of the weapon. This enables the image sensor unit to be horizontally located, and greatly shortens the axial length of the unit that is tilted, thereby enabling the system to be employed in a space that is quite limited in the vertical direction. This is an important advantage of the third weapon form 304 in the aircraft environment of the present system because of the space limitation inherent in such environment.

The weapon form 304 is driven for a firing sequence by the stepper motor 302, spur gear 306 and ring gear 308, the latter being peripherally disposed proximate the rear end of weapon 304.

A stationary tubular body 620 extends axially through the entire length of the weapon 304, the tubular rearward portion 622 thereof having an externally threaded end 624 that is exposed for threaded engagement with a mounting plate or the like. The tubular body 620 also includes as an integral part thereof a forward barrel portion 626 having a series of parallel, regularly spaced barrels 628 (sixteen in number in the illustrated embodiment) extending therethrough.

The forward barrel portion 626 of body 620 also has a series of firing pin sleeve bores 630 regularly spaced therein, the sleeve bores opening rearwardly but being closed at their forward ends. The sleeve bores 630 are provided in the same number as the barrels 628, and each of the sleeve bores 630 is located intermediate but radially outwardly from a respective adjacent pair of the barrels 628.

A series of firing pin units generally designated 632 is provided, each of such units 632 having a forward sleeve portion 634 that is axially slidably engaged in a respective sleeve bore 630. Each of the firing pin sleeves 634 has a cutaway portion defining a flat, outwardly facing side 635, and a helical firing pin compression spring 636 is disposed within each of the firing pin sleeves 634.

A retainer ring 638, which is diametrically split for assembly and disassembly of the weapon, is engaged in an annular groove 640 in the barrel 626. The retainer ring 638 provides a backing for the firing pin springs 636 which are exposed to the ring 638 by the cutaway portions of the sleeves 634. Retainer ring 638 also serves to fix each of the firing pin units 632 against pivoting or rotational movement, while nevertheless allowing axial sliding movement thereof, by engagement of the inner surface 639 thereof against the flat sides 635 of the firing pin sleeves 634.

The firing pin units 632 also each include a transverse head portion 642 which has a firing pin 644 projecting forwardly therefrom offset from the respective sleeves 634.

A cartridge backup plate is fixedly positioned against the rear end of the barrel 626, and includes a rearwardly extending axial section 647 which overlies the tubular rearward portion 622 of the body 620. The cartridge backup plate 646 has a series of regularly spaced passages 648 therein which are aligned with respective sleeve bores 630 in the barrel body, and through which the firing pin sleeves 634 are engaged. Backup plate 646 also includes a regularly spaced series of fire pin holes 650 that are axially aligned with the respective firing pins 644. A regularly spaced series of pivot pin holes 652 is also provided through backup plate 646 for the pivotal mounting of a series of trip blocks 654 about the periphery of the backup plate 646.

One of the trip blocks 654 is provided in association with each of the firing pin units 632, each trip block 654 having a slot 656 therein for engagement over the periphery of plate 646, a pivot pin 658 being engaged through each trip block 654 and a respective pivot pin hole 652 in the plate 646, for pivotal mounting of the trip blocks 654 in regularly spaced relationship about the periphery of the backup plate 646.

Each trip block 654 includes a rearwardly extending tripping lug 660 that is engaged under a forwardly facing shoulder 662 on a respective firing pin unit 632 in the cocked condition of the firing pin unit. Each of the trip blocks 654 also includes a rearwardly extending actuator pin 664.

A pair of diametrically opposed trip pins 666 is fixedly mounted in a trip ring 668, projecting radially inwardly from the ring 668, and a corresponding diametrically opposed pair of trip block release recesses is provided in the inside of trip ring 668 adjacent to the respective trip pins 666. The tripping action is best illustrated in FIG. 31, wherein the two trip blocks 654 to the left of trip pin 666 and their respective firing pin units 632 are in the cocked condition; the two trip blocks 654 to the right of trip pins 666 and their respective firing pin units 632 are in the release condition; and the trip block 654 in the center is being actuated by the trip pin 666. It will be noted from FIG. 31 that a trip block 654 in its cocked condition has its tripping lug 660 projecting generally radially inwardly under the respective firing pin unit shoulder 662, with its actuator pin 664 in circumferential alignment with the oncoming trip pin 666. This may be considered the clockwise position of such cocked trip block 654. The trip block is normally locked in this cocked position by the inner annular wall of trip ring 668 which prevents anticlockwise rotation of the trip block 654, thereby securing the cocked firing pin units 632 against inadvertent release and accidental firing of the weapon.

However, as illustrated by the central trip block 654 in FIG. 31, when the trip pin 666 comes into engagement with the actuator pin 664 of a particular trip block 654, by that time the adjacent release recess 670 in the trip ring 668 has come into registry with the respective trip block 654, thereby relieving the trip block 654 so that it can be pivoted to the left or anticlockwise as viewed in FIG. 31 so as to move the tripping lug 660 out from under the firing pin shoulder 662 to release the firing pin. The trip pin 666 continues to pivot the trip block 654 to its anticlockwise, fully released position as illustrated by the two right-hand trip blocks 654 in FIG. 31, wherein the continuing inner wall of the trip ring 668 assures no further movement thereof.

Referring now particularly to FIGS. 29 and 30, a sleeve-like bearing housing 672 is rotatable about the forward barrel portion 626 on needle bearings 674, and is axially positioned by means of a front retainer ring 676 threaded onto the radially outwardly flanged forward end of the barrel portion 626. The trip ring 668 is rotationally coupled to bearing housing 672 by engagement of the trip pins 666 through respective diametrically opposed, rearwardly opening coupling slots 678 in bearing housing 672. The trip ring 668 has the ring gear 308 integrally formed thereon, and includes a rear cover plate portion 680 extending radially inwardly from the ring gear 308. The trip ring 668 is axially retained in coupled engagement over the bearing housing 672 by means of a retainer ring 682, such as a snap ring, releasably engaged on the tubular rearward portion 622 of body 620. The cartridge backup plate 646 is secured in its operative position against rearward shifting by having a rearwardly facing shoulder 683 on its axial section 647 which is opposed by the inner edge of cover plate 680. Recoil will be taken up the mounting structure in which the externally threaded end 624 of body 620 is engaged.

A stepped lens housing 684 fits coaxially within body 620 and may be threadedly connected therewith at the rear end. Lens housing 684 as illustrated in FIG. 29 has a lineal scope arrangement of field lens 262, reticle lens 264 and objective lens 266.

A single firing sequence for the weapon 304 is caused by actuation of stepper motor 302 to cause a single stepping increment of the trip ring 668 anticlockwise as viewed in FIGS. 30 and 31, and clockwise as viewed in FIG. 29, such increment being sufficient to cause the release of a pair of diametrically opposed firing pin units 632 as described in detail hereinabove in connection with FIG. 31. Each such firing actuation of the weapon will fire a new diametrically opposed pair of cartridges adjacent to the pair last previously fired, so as to produce a double helix firing pattern.

FIG. 32 illustrates the weapon form of FIGS. 29 to 31 as applied in connection with the single right angle light deflection optics form 210 shown in FIGS. 10 and 11; and corresponding reference numerals have been applied where appropriate in FIG. 32. Thus, in the optics form 210 as illustrated in FIG. 32, the weapon-forward optics combination 42, which utilizes the weapon shown in detail in FIGS. 29 to 31, has coaxially disposed in its throat the objective lens 224 and reticle lens 222. The 90° light deflector 220 and the field lens 218 are mounted in tubular body 212. The image sensor tube 46 is illustrated as being supported in a sleeve 690 that is rotatable in the axial section 214 of tubular body 212. With this arrangement, as the tubular body axial section 214 rotates or pivots in one direction corresponding to tilting of the weapon-forward optics combination 42, the image sensor support sleeve 690 and image sensor 46 contained therein are rotated about the same axis in the opposite direction during the first 90° of tilting, and in the same direction during the second 90° of tilting, as described in detail in connection with FIGS. 10 and 11.

Figure 33:
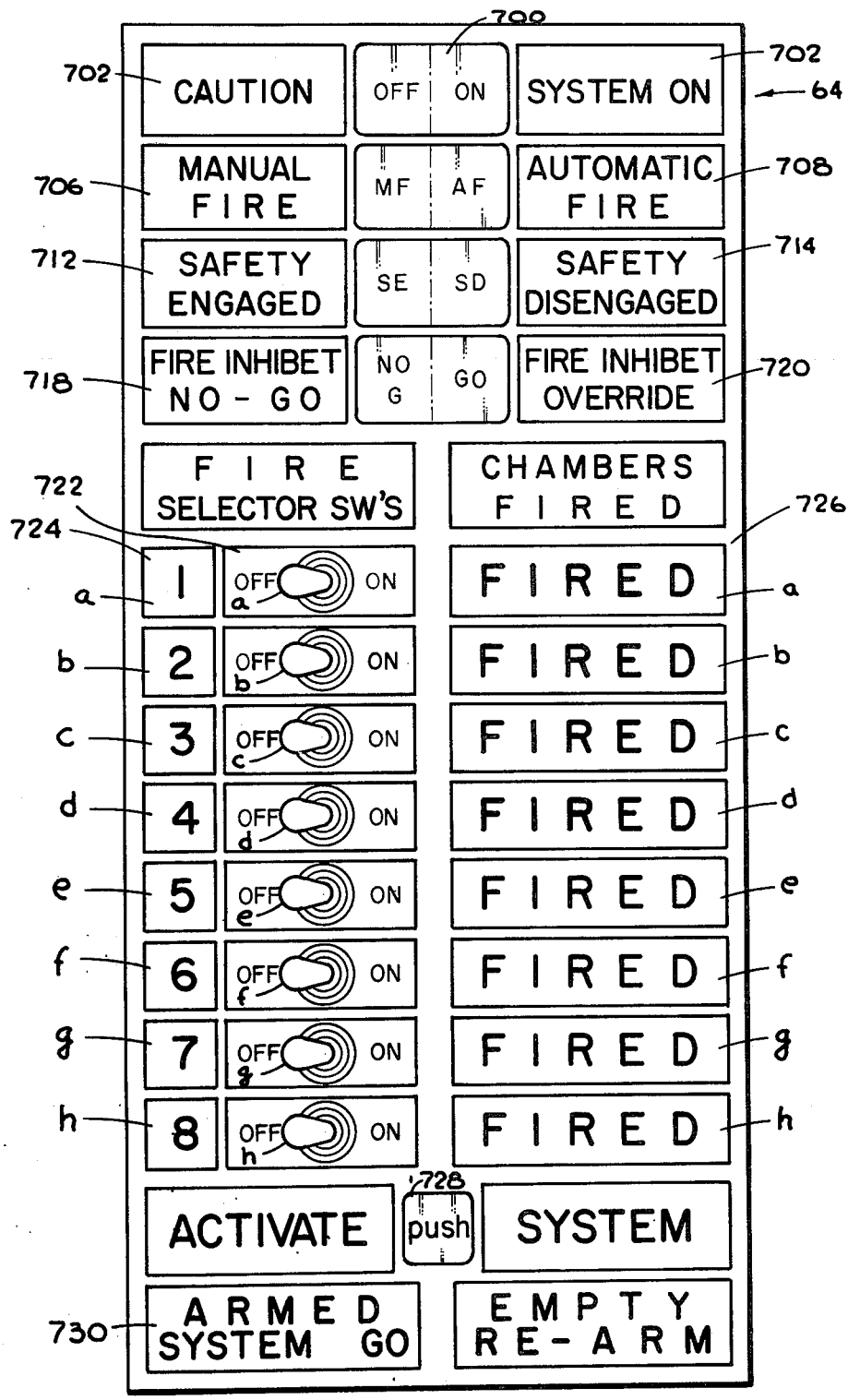
FIG. 33 is a plan view of the fire control panel which constitutes a portion of the control and surveillance console.

FIG. 33 illustrates a presently preferred fire control board or panel 64 on the control and surveillance console 26. The panel 64 that is shown is particularly adapted for the present invention as applied to a confined space, such as aircraft cabin, bank, prison, store or the like, having certain inhibit areas which are defined by the encoder system.

Starting at the top of FIG. 33, the first switch is an on/off master switch 700 preferably in the form of a butterfly rocker switch as illustrated. A "Caution System On" light panel 702 is disposed on both sides of the master switch 700, being off when switch 700 is off and being turned on when switch 700 is on. The light panel 720, as well as the other light panels illustrated in FIG. 33 and described hereinafter, is arranged so that when the light comes on, the wording on the panel shows through.

The next switch 704 is the manual/automatic fire control switch, and is movable between a manual fire position in which a "Manual Fire" light panel 706 is illuminated and an automatic fire position wherein a "Automatic Fire" light panel 708 is illuminated.

The third switch 710 a safety switch, and is movable between a safety on position wherein a "Safety Engaged" light panel 712 is illuminated and a safety off position wherein a "Safety Disengaged" light panel 714 is illuminated.

The next rocker switch 716 is a fire inhibit override switch, which is movable between a normal inhibit position wherein the inhibit encoder wheel positioning determines whether the system is in a "go" or a "no-go" condition, and an override position to override a "no-go" condition of the encoders. The fire inhibit override switch 716 has two light panels 718 and 720 associated therewith, both of which are normally in an off or non-illuminated condition. With the switch 716 in its normal or no-go position, if the travel, pan and tilt encoder wheels all line up to a no-go condition, then the left-hand light panel 718 will become illuminated in a "Fire Inhibit No-Go" exhibit. Actuation of the override switch 716 will cause the light panel 718 to go out and the right-hand panel 720 to be illuminated in a "Fire Inhibit Override" exhibit.

Next, on the left-hand side of fire control panel 64 is a series of eight fire selector switches, this series being generally designated 722, and the individual switches being designated 722a, b, c, d, e, f, g, and h, respectively.

Each of the fire selector switches 722a to h represents one of the eight pairs of shots to be fired by the weapon. One or more of the switches 722 are turned on in a sequence 722a, b, etc., to pre-select the number of firings (pairs of shots) that can occur in either the manual fire position 706 or the automatic fire position 708 of the manual/automatic fire control switch 704. Adjacent to the series 722 of fire selector switches is a series 724 of respective fire selector lights 724a, b, c, d, e, f, g and h which are turned on in sequence starting with 724a, b, etc., corresponding to the sequence of fire selector switches 722a, b, etc., that is turned on to the "on" position.

On the right-hand side of fire control panel 64 is a series 726 of eight "fired" lights 726a, b, c, d, e, f, g and h, which correspond to the respective fire selector switches 722 and fire selector lights 724; the "fired" lights 726 normally being off, but turning on in the sequence 726a, b, etc., as the respective firings (pairs of barrels) occur.

Next in order on the fire control panel 64 is pulse switch 728 which is adapted to be momentarily actuated for recycling the system. This is done after all barrels have been fired, and the barrel body of the weapon has been removed, reloaded, and re-engaged in the weapon. Then, the pulse switch 728 is momentarily pushed to reset the various relays in the system, which will cause all of the "fired" lights 726 to be turned off.

At the bottom of the fire control panel 64, on the left-hand side, is a light panel 730 which, when turned on, exhibits the words "Armed System Go". This "Armed System Go" light panel 730 becomes illuminated when the pulse switch 728 is pushed to recycle the system, and will remain on (provided the master switch 700 is on) while the system remains armed, and until the last pair of chambers has been fired.

At the lower right-hand corner of the fire control panel 64 is a further light panel 732 which remains off when the system is armed, i.e., when the "Armed System Go" light panel 730 is on. When the last pair of shots is fired, as indicated by the "fired" light 726h coming on and also the "Armed System Go" light panel 730 going off, the light panel 732 becomes illuminated to exhibit the words "Empty Re-Arm", thereby indicating the necessity of reloading and then recycling the system with the pulse switch 728.

Figure 34:
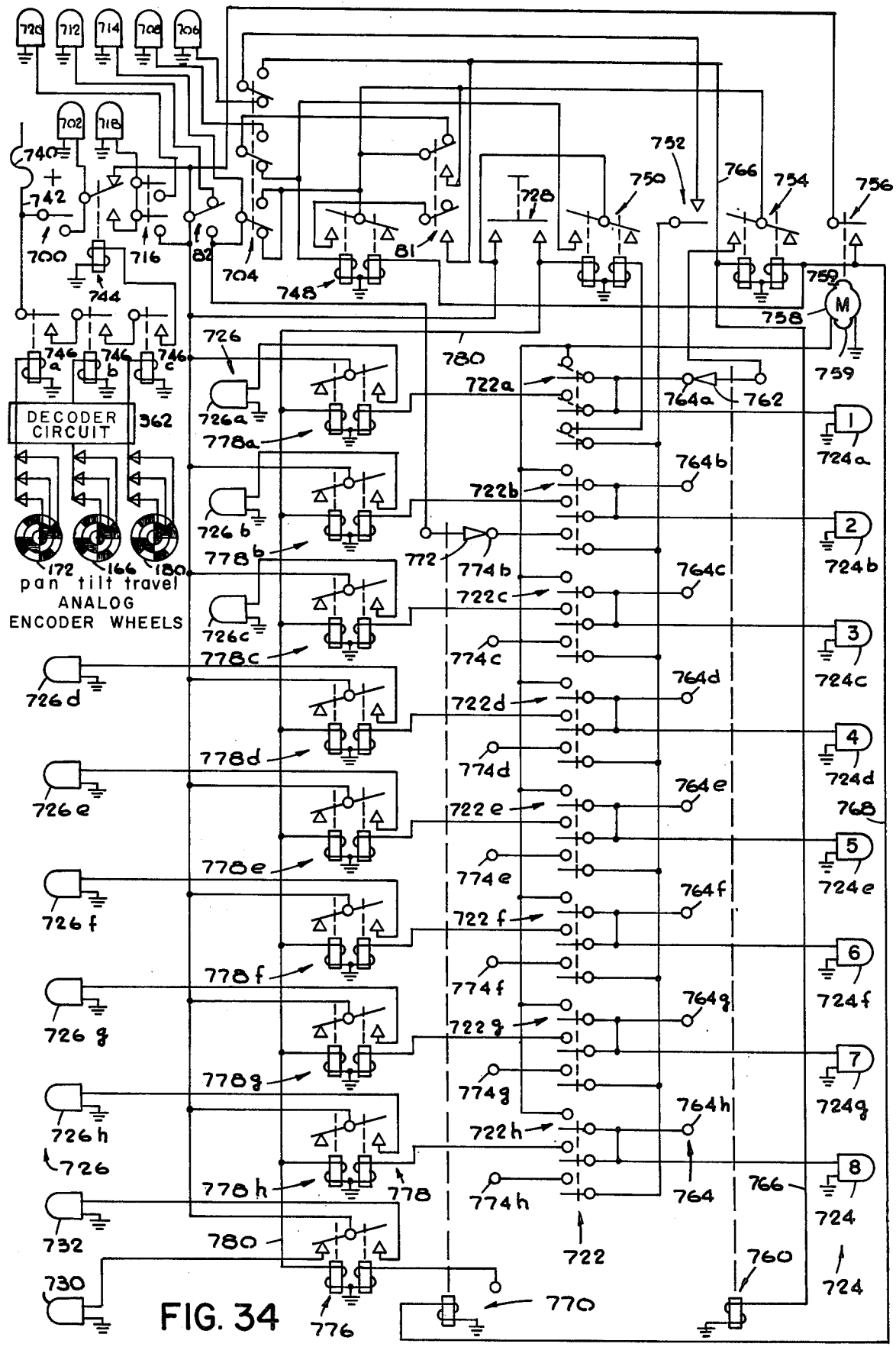
FIG. 34 is a wiring diagram of a weapon fire control system that may be employed in the present invention.

Reference will now be made to FIG. 34, which is a detailed wiring diagram for the system embodying the various fire control elements of the fire control board or panel 64 shown in FIG. 33.

Starting at the upper left-hand corner part of the circuit diagram in FIG. 34, positive DC voltage is applied to the system through overload fuse or circuit breaker 740 and input conductor 742 to the on/off master switch 700. Switch 700 is connected to the "Caution System On" light 702 so that the latter is illuminated when switch 700 is closed. A fire inhibit relay 744 is connected to master switch 700 to connect switch 700 to the rest of the circuit in its normal, unenergized condition as shown, being adapted to be overridden in its energized condition by fire inhibit override switch 716. The fire inhibit relay 744 is energized pursuant to the energization of all three encoder relays 746a, b and c corresponding, respectively, to pan, tilt and travel encoding. When the fire inhibit relay 744 is energized, the fire inhibit no-go light 718 is illuminated, then, if fire inhibit override switch 716 is actuated, its light 720 is connected and turned on, while at the same time the inhibit no-go light 718 is turned off.

Next in the circuit is the safety switch 82, which is shown in the "on" position, so that its "Safety Engaged" light 712 is illuminated. Connected to the safety switch 82 is the manual/automatic fire control switch 704, which is illustrated in its manual fire position, wherein the "Manual Fire" light 706 is on, and the "Automatic Fire" light 708 is off.

Next in order from left to right across the upper portion of the circuit diagram in FIG. 34 are trigger control relay 748, which is a double latching relay; trigger switch 81, shown in its off or non-firing position; the "Activate System" pulse switch 728 adapted for momentary actuation to recycle the system; recycling relay 750 associated with the recycling pulse switch 728; a normally open firing pin microswitch 752 which closes in response to the bottoming of a firing pin to provide a pulse that continues an automatic firing sequence, but is not used in single firing. Immediately to the right of the firing pin microswitch 752 in the circuit diagram is weapon discharge relay 754; and to the right of relay 754 is firing motor microswitch 756. The motor microswitch 756 is a normally open switch, being closed by the firing motor 758 when the motor reaches the end of a firing cycle. The motor 758 is diagrammatically shown with a pair of cams 759 thereon, representing completion of a firing cycle at the end of each 180° of motor movement, at which time one of the cams 759 will close the microswitch 756. Closure of microswitch 756 energizes the right-hand coil of the double latching weapon discharge relay 754 so that the latter relay is in the position illustrated, which is the nonfiring position. The weapon discharge relay 754 is shiftable to the firing or weapon discharge position by energization of its left-hand coil, which occurs when the manual/automatic fire control switch 704 is in its upper, automatic position by a current pulse provided through the firing pin microswitch 752; or when the manual/automatic fire control switch 704 is in the manual position as shown by current provided through trigger control relay 748 and trigger switch 81 when the latter is depressed.

Simultaneously with the energization of the left-hand coil in weapon discharge relay 754, current is provided to a first stepper switch 760, which is an eight-position stepper switch of the type that will move from its 8th position back to its first position (as for example a rotary stepper switch). The first stepper switch 760 includes stepper wiper 762 that is adapted to successively make contact with a series 764 of eight contact members 764a, b, c, d, e, f, g and h, associated with the respective selector switches 722a, b, c, etc. When the stepper wiper 762 engages a contact member 764a, b, etc., associated with a closed fire selector switch 722a, b, etc., such connection will provide current to the firing motor 758 to initiate a firing sequence.

A firing signal current applied to conductor 766 will simultaneously energize the left-hand coil of weapon discharge relay 754 and energize first stepper switch 760 to step the wiper 762. Assuming the weapon has just been reloaded, the wiper 762 will thereby be stepped from the eighth position to the first position as illustrated, and since the wiper 762 is itself provided with current through the discharge relay 754, when it makes contact with the first contact member 764a, if the selector switch 722a is closed, it will furnish current to the motor 758 for a firing cycle. At the end of such cycle, a motor cam 760 will close the normally open motor microswitch 756, which will move discharge relay 754 to the nonfiring position as illustrated, and also will provide current to a conductor 768 to energize a second stepper switch 770 that includes a stepper wiper 772. The second stepper switch 770 is also of the repeating type, as for example a rotary type stepper switch, and its stepper wiper 772 is adapted to sequentially make contact with a series 774 of contact members 774a, b, c, d, e, f, g and h. Contact members 774b, c, d, e, f, g and h are operatively connected to the respective fire selector switches 722b, c, d, e, f, g and h. However, the contact member 774a is operatively connected to a double latching relay 776, the stepper wiper 772 engaging the contact member 774a after the last pair of shots has been fired, which energizes the right-hand coil of the relay 776 so as to turn on the "Empty Re-Arm" light 732.

The stepper wiper 772 is in this position in contact with the contact member 774a when the first firing sequence occurs as described above, involving energization of the left-hand coil of weapon discharge relay 754, simultaneous energization of first stepper switch 760 to move its wiper 762 into contact with the contact member 764a, and consequent actuation of the firing motor 758. The resulting current pulse from motor microswitch 756 through conductor 768 energizes the second stepper switch 770 to then step its wiper 772 into the "b" position in contact with the contact member 774b. Stepper wiper 772 is provided with current from safety switch 82, and if fire selector switch 722 is in its on position, current will be provided therethrough to the firing pin microswitch 752 which will be closed pursuant to the bottoming of a firing pin from the firing sequence that just occurred. If the manual/automatic fire control switch 704 is in the manual position as shown, such electrical connection from the wiper 772 to the firing pin microswitch 752 will be ineffective; however, if the manual/automatic fire control switch 704 is in the automatic fire position, or the up position as illustrated, then such electrical connection to the firing pin microswitch 752 will again provide current to the conductor 766 so as to energize the left-hand coil in weapon discharge relay 754 and energize the first stepper switch 760 to move its wiper 762 into engagement with contact member 764b; and if the fire selector switch 722 is in its on position, this will again energize the motor 758 for a second firing sequence. On the other hand, if the manual/automatic fire control switch 704 is in the manual position, actuation of the trigger switch 81 is necessary to again provide current to the conductor 766 to cause such further actuation of firing motor 758. Nevertheless, if the fire selector switch 722 is in its off position, current will not be provided to the motor 758, and the second firing sequence will not occur.

If the second firing sequence did occur, then upon completion thereof a motor cam 759 will close motor switch 756, to again shift the discharge 754 to the right as shown, and to again provide current through conductor 768 to energize stepper 770 so as to move its wiper 772 into contact with the contact member 774c to prepare for a third firing sequence.

It will be apparent that if the manual/automatic fire control switch 704 is in the automatic position, automatic firing will be sequenced through as many of the fire selector switches 722 as are in the on position, until such time as a fire selector switch 772 is encountered that is in the off position. Similarly, if the manual/automatic fire control switch 704 is in the manual position as shown, semiautomatic firing will be accomplished by successive actuation of trigger switch 81 until a closed fire selector switch 722 is encountered.

A series of double locking relays 778 includes individual relays 778a, b, c, d, e, f, g and h, which respectively control the lighting of the corresponding eight "fired" lamps 726a to h. The right-hand coils, as illustrated, of these relays 778a to h are connected to the respective fire selector switches 772a, b, c, etc., so that when the energized wiper 762 of the first stepper switch 760 contacts a respective contact member 764a, b, c, etc., to cause a firing sequence through such fire selector switch 722a, b, c, etc., that is in its on or firing position, it will provide current to the right-hand coil of the respective relay 778a, b, c, etc., to turn on its "fired" light a, b, c, etc., and will lock in the lighted position. In this manner, the "fired" lights 726a, b, c, etc., will be successively turned on pursuant to a corresponding firing event. The last "fired" light 726h will become illuminated pursuant to actuation of the respective relay 778h, so that at that time all of the lights in the series 726 will become illuminated. At the end of such eighth firing event, closure of the motor microswitch 756 by a motor cam 759 will energize the conductor 768 and hence the second stepper switch 770 to move its wiper 772 into contact with the contact member 774a to energize the right-hand coil in relay 776 and turn the "Empty Re-Arm" light 732 on.

After the weapon has been reloaded, momentary depression of the recycling pulse switch 728 to reactivate the system will shift the double locking recycling relay 750 from the position illustrated to the left into its recycling position, and will provide current to conductor 780 which energizes the left-hand coil on the relay 776 and on all of the relays 778a to h, thereby turning off the "Empty Re-Arm" light 732, turning on the "Armed System Go" light 730, and turning off all of the "fired" lights 726a to h. Such actuation of the pulse switch 728 also energizes the left-hand coil of trigger control relay 748 to move the latter to its actuated position from the position shown. Bottoming of the firing pin to close its microswitch 752 after the first firing sequence will energize the right-hand coil in recycling relay 750 to shift the latter back to the position shown, in preparation for further recycling sequence. The right-hand coil of trigger control relay 748 is connected to the motor switch 756 so that at the end of each firing cycle, the trigger relay is shifted to the position shown, which prevents manual firing again until the trigger switch 81 is released to the position shown, which reenergizes the left-hand coil of the trigger control relay 748, thereby preparing the trigger circuit for another manual firing sequence. Automatic firing is not dependent upon such resetting of the trigger control relay 748, because the automatic firing current is provided directly through the firing pin microswitch 752 and the upper contacts of manual/automatic fire control switch 704 to the weapon discharge relay 754 and first stepper switch 760.

If only a portion of the fire selector switches 722 is turned on, so that either a manual or an automatic series of firing events is terminated by reaching an "off" position fire selector switch 722, then further firings can be made available to complete the full series by simply turning on further fire selector switches 722.

In operation, assuming the system is to be fired manually, the on/off master switch 700 is turned to the "on" position, and the "Caution System On" light panel 702 will become illuminated. The "Activate System" pulse switch 728 is pushed, and all eight of the "fired" lights 726a, b, c, etc., are shut off. At the same time the "Armed System Go" light panel 730 will become illuminated. It is assumed that the weapon was already loaded, so that the "Empty Re-Arm" light panel 732 is off. Normally, the safety switch 710 will be on, so that the "Safety Engaged" light panel 712 will be illuminated. To prepare for firing, the safety switch 710 will be moved to the off position, so that the light 712 will be turned off and the "Safety Disengaged" panel 714 will be illuminated. The manual/automatic fire control switch 704 is switched to the manual fire position, and the corresponding light panel 706 will read "Manual Fire".

According to the number of shots contemplated, one or more of the fire selector switches 722a, b, c, etc., will be turned on in that order, and the pairs of barrels thus prepared for firing are correspondingly indicated by the fire selector lights 724a, b, c, etc. The weapon is then in condition for manual firing, and the trigger switch 81 can be pulsed for single fire, and when the trigger 81 is released, it is then reset for another single fire, and so on according to the number of fire control switches 722a, b, c, etc., that are turned on. This is technically a "semiautomatic" type of firing. Each time a shot is thus fired, a corresponding "fired" light 726a, b, c, etc., will come on. If all eight shot pairs are to be fired, then all eight of the fire selector switches 722a to h will be in the on or closed position; any one of the fire selector switches 722a to h that is in the "off" or open position will break the sequence and firing will be stopped at that switch. When all eight shot pairs have been fired, the readout light panel 732 will come on reading "Empty Re-Arm".

For automatic fire, the system is operated in exactly the same way, except that the manual/automatic fire control switch 704 is moved to the automatic fire position, wherein the appropriate light panel 708 will read "Automatic Fire", and the manual fire light panel 706 will be off. The fire selector switches 722a, b, c, etc., are turned on in that sequence according to the number of shots that are to be automatically fired. Thus, if all eight shot pairs are to be automatically fired, than all eight of the fire selector switches 722a to h must be moved to the "on" position. If only four shot pairs are to be fired automatically in sequence, then the number 5 fire selector switch 722e is placed in the "off" or open position, which will break the sequence at the end of the fourth shot pair. Then, if the sequence is to be continued at a later time, the number 5 switch 722e is turned to the "on" position, and, assuming that the remaining switches 722f, g, and h are "on", then a further actuation of the trigger switch 81 will cause the remaining four shot pairs to be automatically fired, at the end of which all of the "fired" lights 726a to h will be on; the "Armed System Go" light panel 730 turn off, and the "Empty Re-Arm" light panel 732 will be on.

After the system is re-armed, the same procedure is repeated to prepare the weapon for firing and to fire the weapon in either the single shot (semiautomatic) mode or the automatic (fully automatic) mode.

Reference will now be made to FIG. 35, which diagrammatically illustrates a suitable individual seating circuit arrangement for indicating on the seat signal board 66 of control and surveillance console 26, the status of each seat on an airplane. The circuit shown in FIG. 35 is particularly useful in that it indicates whether or not a particular seat is occupied for a certain flight; and then it further indicates when an occupied seat has been temporarily vacated.

The circuit in FIG. 35 includes DC power input conductor 800 which is connected to a normally open double pole, single throw seat pressure switch 802. One contact of switch 802 connects to a first light 804 at the seat signal board 66, the light 804 having a readout cover 806. The other contact of pressure switch 802 is connected to the left-hand coil of double latching relay 808 which, in one position thereof, is adapted to connect the input conductor 800 to a second light 810 at the seat signal board 66, light 810 having a readout cover 812. A reset pulse switch 814 is adapted to momentarily connect the input conductor to the right-hand coil of relay 808 to reset the circuit after a flight, the reset pulse switch 814 being located at the control and surveillance console 26 as a part of or in conjunction with the seat signal board 66. Each seat in the aircraft will have a circuit therefor like the circuit shown in FIG. 35, and before the passengers are permitted to board the aircraft, all seat circuits are placed in the unactuated condition as illustrated in FIG. 35 by actuation of the pulse switches 814. In this unactuated condition of the circuit, both of the lights 804 and 810 are out, so that all of the seating lights will be out on the seat signal board 66, indicating that no passengers have as yet been seated.

In the event a passenger never sits in the particular seat represented by the circuit shown in FIG. 35, then the circuit will remain in the unactuated condition as illustrated, both lights 804 and 810 remaining out and thus indicating to the operator of the system that such seat has never been occupied by a passenger during the particular flight.

Assuming a passenger sits down in the seat represented by the circuit of FIG. 35, when he sits down this will actuate the pressure switch 802, making both contacts thereof. The closure of the upper contact as illustrated will turn on the light 804, thereby illuminating the letter "S" on cover 806 to indicate that a passenger is seated in that particular seat. At the same time, the closure of the lower contact of pressure switch 802 will energize the left-hand coil of relay 808, moving relay 808 to the closed circuit position for a second light 810, turning that light on and illuminating the "O" on the cover 812 of the second light to indicate that the seat is occupied. The relay 808 will remain latched in this condition throughout the flight, i.e., until the reset pulse switch 814 is again actuated, which will not be until the last passenger has left the airplane, and the airplane is being prepared for another flight.

Accordingly, the second light 810 will at all times during a flight indicate to the operator of the system that this is an occupied seat. On the other hand, the light 804 is at all times directly responsive to the condition of pressure switch 802, and hence it will only remain illuminated so long as the passenger remains in the seat. Thus, should this passenger temporarily vacate his seat, this act will instantaneously open the pressure switch 802 and turn off the light 802, thus no longer illuminating the "S" seated indicator. The light 804 will then remain out until the passenger re-occupies his seat.

By this means, the operator of the system need not pay any attention to seats that have never shown an "occupied" light 810, and need only pay attention to those seats which have shown the "occupied" light 810. Since a hijacker or extortionist in almost all instances will leave his seat and either accost a stewardess or attempt to reach the cockpit area of the airplane, he will, immediately upon leaving the seat, cause the "seated" light 804 to go out. Accordingly, attention of the operator of the system need not be directed to seats with no lights, or seats for which both lights are on, but only those seats which had both lights on and for which the "seated" light 804 goes out. This greatly reduces the problem of passenger observation. Additionally, there are certain passenger "types" which have in the aircraft business been determined to be potentially dangerous, and there are rarely more than several of these "types" on any particular flight. Such "types" are currently placed under careful observation anyway, and with the aid of the seating circuit arrangement shown in FIG. 35, once such "types" have been identified with a particular seat, they are easily monitored from the console 26. As soon as any suspicious person who is already under observation leaves his seat, the warning light from the circuit of FIG. 35 will alert the operator of the system, and he can put the mobile unit 28 into operation to visually monitor the suspect, and if necessary can utilize the associated weapon.

While the instant invention has been shown and described herein in what are conceived to be the most practical and preferred embodiments, it is recognized that departures may be made therefrom within the scope of the invention.

I claim:

1. A remotely controlled surveillance and weapon system for the protection of a limited region, which comprises a weapon and optical scope means in fixed alignment so that the aim thereof is substantially coincident, means mounting said weapon and scope means for at least pan and tilt movability, one-way vision screen means interposed between said region and said weapon and scope means permitting vision in the direction from said scope means toward said region and precluding vision in the direction from said region toward said weapon and scope means, said screen means being arranged to substantially completely obscure said weapon and scope means from the view of persons in said limited region, electronic image sensor means optically coupled with said scope means to receive an optical image therefrom and substantially completely obscured from the view of persons in said limited region; a surveillance and control station disposed outside of said limited region, said station including a video surveillance screen operatively connected to said image sensor to exhibit a video image derived from said image sensor and reticle means in fixed position in said optical scope means whereby an image of said reticle is exhibited on said video image to indicate the point at which said weapon is aimed, a movement control unit operatively connected to said weapon and scope means and operable to produce at least pan and tilt movements of the weapon and scope means, and remote weapon firing means operatively connected to the weapon for firing the weapon through said screen means.

2. A system as defined in claim 1, wherein said movement control unit comprises a movable manual control unit drivingly coupled to the weapon and scope means so as to move the weapon and scope means in at least pan and tilt movements in response to corresponding movements of the control unit.

3. A remotely controlled surveillance and weapon system for the protection of a limited region, which comprises a weapon and optical scope means in fixed alignment so that the aim thereof is substantially coincident, means mounting said weapon and scope means for at least pan and tilt movability, one-way vision screen means interposed between said region and said weapon and scope means permitting vision in the direction from said scope means toward said region and precluding vision in the direction from said region toward said weapon and scope means, said screen means being arranged to substantially completely obscure said weapon and scope means from the view of persons in said limited region, electronic image sensor means optically coupled with said scope means to receive an optical image therefrom and substantially completely obscured from the view of persons in said limited region; a surveillance and control station disposed outside of said limited region, said station including a video surveillance screen operatively connected to said image sensor to exhibit a video image derived from said image sensor, a movement control unit operatively connected to said weapon and scope means and operable to produce at least pan and tilt movements of the weapon and scope means, and remote weapon firing means operatively connected to the weapon for firing the weapon through said screen means; and a mobile unit mounted for linear travel behind said screen means, said weapon and scope means and said image sensor means being mounted on said mobile unit, with said weapon and scope means being mounted on said mobile unit for pan and tilt movability, said movement control unit being operatively connected to said mobile unit and to the weapon and scope means thereon to produce linear movement of the mobile unit and pan and tilt movements of the weapon and scope means.

4. A system as defined in claim 3, wherein said movement control unit comprises a movable manual control unit drivingly coupled to the mobile unit and to the weapon and scope means thereon so as to move the mobile unit linearly and the weapon and scope means in pan and tilt movements in response to corresponding movements of the control unit.

5. A system as defined in claim 4, wherein said control unit comprises an upwardly extending arm terminating in a yoke at its upper end, the yoke having a transverse handle supported thereacross, the arm being movable in a generally forward-rearward direction about a generally horizontal pivot axis to produce corresponding forward-rearward linear movements of the mobile unit, the yoke being pivoted about the axis of the arm to produce corresponding panning movements of the weapon and scope means, and the handle being pivotable in the yoke to produce corresponding tilting movements of the weapon and scope means.

6. A system as defined in claim 5, wherein said control unit is disposed directly in front of said video surveillance screen, and said scope means, image sensor means, video surveillance screen and control unit are all correlated so that the linear, pan and tilt movements as viewed on the video surveillance screen will be correlated as to direction with movements of the control unit producing them.

7. A system as defined in claim 1, which includes an inhibit system operatively connected to the weapon firing means to disable the firing means when the weapon is directed at certain predetermined prohibited locations in said confined region.

8. A system as defined in claim 7, wherein said weapon firing means includes inhibit override means enabling the weapon to be fired even though it may be directed at one of said prohibited locations.

9. A system as defined in claim 7, wherein said inhibit system comprises pan encoder means responsive to pan movements of the weapon and scope means, tilt encoder means responsive to tilt movements of the weapon and scope means and decoder means operatively connected to said pan encoder means, to said tilt encoder means and to said weapon firing means, each of said pan and tilt encoder means providing a series of go and no-go signals to said decoder means corresponding to various pan and tilt positions of the weapon and scope means, and said decoder disabling said firing means when both of said pan and tilt encoder means simultaneously provide no-go signals to said decoder means.

10. A remotely controlled surveillance and weapon system for the protection of a limited region, which comprises a weapon and optical scope means in fixed alignment so that the aim thereof is substantially coincident, means mounting said weapon and scope means for at least pan and tilt movability, one-way vision screen means interposed between said region and said weapon and scope means permitting vision in the direction from said scope means toward said region and precluding vision in the direction from said region toward said weapon and scope means, said screen means being arranged to substantially completely obscure said weapon and scope means from the view of persons in said limited region, electronic image sensor means optically coupled with said scope means to receive an optical image therefrom and substantially completely obscured from the view of persons in said limited region; a surveillance and control station disposed outside of said limited region, said station including a video surveillance screen operatively connected to said image sensor to exhibit a video image derived from said image sensor, a movement control unit operatively connected to said weapon and scope means and operable to produce at least pan and tilt movements of the weapon and scope means, and remote weapon firing means operatively connected to the weapon for firing the weapon through said screen means;

an inhibit system operatively connected to the weapon firing means to disable the firing means when the weapon is directed at certain predetermined prohibited locations in said limited region, said inhibit system comprising pan encoder means responsive to pan movements of the weapon and scope means, tilt encoder means responsive to tilt movements of the weapon and scope means and decoder means operatively connected to said pan encoder means, to said tilt encoder means and to said weapon firing means, each of said pan and tilt encoder means providing a series of go and no-go signals to said decoder means corresponding to various pan and tilt positions of the weapon and scope means, and said decoder disabling said firing means when both of said pan and tilt encoder means simultaneously provide no-go signals to said decoder means; and a mobile unit mounted for linear travel behind said screen means, said weapon and scope means and said image sensor means being mounted on said mobile unit, with said weapon and scope means being mounted on said mobile unit for pan and tilt movability, said movement control unit being operatively connected to said mobile unit and to the weapon and scope means thereon to produce linear travel movement of the mobile unit and pan and tilt movements of the weapon and scope means, and linear travel encoder means responsive to linear travel movements of said mobile unit and operatively connected to said decoder means, said linear travel encoder means providing a series of go and no-go signals to said decoder means corresponding to various linear travel positions of the mobile unit, said decoder disabling said firing means when all three of said pan, tilt and linear travel encoder means provide no-go signals to said decoder means.

11. A system as defined in claim 10, wherein said encoder means are analog encoders.

12. A system as defined in claim 10, wherein said encoder means comprise encoder wheel means.

13. A system as defined in claim 12, wherein said encoder wheel means have go/no-go information thereon in binary form.

14. A system as defined in claim 1, wherein said limited region has a ceiling and a space is defined above said ceiling, said one-way vision screen means being mounted proximate said ceiling, with said weapon and scope means disposed in said space above the ceiling.

15. A system as defined in claim 14, wherein said system is an aircraft anti-hijacking system, said one-way vision screen means being mounted proximate a ceiling in a passenger compartment of an aircraft.

16. A remotely controlled surveillance and weapon system for the protection of a limited region, which comprises a weapon and optical scope means in fixed alignment so that the aim thereof is substantially coincident, means mounting said weapon and scope means for at least pan and tilt movability, one-way vision screen means interposed between said region and said weapon and scope means permitting vision in the direction from said scope means toward said region and precluding vision in the direction from said region toward said weapon and scope means, said screen means being arranged to substantially completely obscure said weapon and scope means from the view of persons in said limited region, electronic image sensor means optically coupled with said scope means to receive an optical image therefrom and substantially completely obscured from the view of persons in said limited region; a surveillance and control station disposed outside of said limited region, said station including a video surveillance screen operatively connected to said image sensor to exhibit a video image derived from said image sensor, a movement control unit operatively connected to said weapon and scope means and operable to produce at least pan and tilt movements of the weapon and scope means, and remote weapon firing means operatively connected to the weapon for firing the weapon through said screen means, said limited region having a ceiling and a space defined above said ceiling, said one-way vision screen means being mounted proximate said ceiling, with said weapon and scope means disposed in said space above the ceiling and wherein said system is an aircraft anti-hijacking system, said one-way vision screen means being mounted proximate a ceiling in a passenger compartment of an aircraft; and a mobile unit mounted for linear travel behind said screen means, said weapon and scope means and said image sensor means being mounted on said mobile unit, with said weapon and scope means being mounted on said mobile unit for pan and tilt movability, said movement control unit being operatively connected to said mobile unit and to the weapon and scope means thereon to produce linear travel movement of the mobile unit and pan and tilt movements of the weapon and scope means, said screen means being generally longitudinally arranged over a substantial portion of the length of said passenger compartment, and said linear travel movement of the mobile unit extending over a substantial portion of the length of said screen means.

17. A system as defined in claim 15, wherein said surveillance and control station is located in the cockpit area of the aircraft.

18. A system as defined in claim 15, wherein said surveillance and control station includes a seat signal board, pressure switch means disposed proximate the individual passenger seats of the aircraft, and electrical circuit means connecting said pressure switch means and said seat signal board to indicate on said seat signal board which seats have been occupied during a flight and which of such occupied seats are temporarily vacated.

19. A system as defined in claim 15, wherein said surveillance and control station includes a weapon fire control panel, said weapon being an electrically actuated multiple fire weapon adapted to sequentially fire a series of missiles, and weapon fire control circuit means connecting said weapon and said fire control panel; said fire control panel and circuit means including preselect switch means for preselecting the number of shots that will fire in sequence, and indicating the number of shots that have been fired.

20. A system as defined in claim 15, wherein said surveillance and control station comprises a control console that is foldable into a table-like structure so as to conceal functional portions thereof when not in use.

21. A system as defined in claim 14, wherein said one-way vision screen means is mounted above a drop ceiling in a room of a building.

22. A remotely controlled surveillance and weapon system for the protection of a limited region, which comprises a weapon and optical scope means in fixed alignment so that the aim thereof is substantially coincident, means mounting said weapon and scope means for at least pan and tilt movability, one-way vision screen means interposed between said region and said weapon and scope means permitting vision in the direction from said scope means toward said region and precluding vision in the direction from said region toward said weapon and scope means, said screen means being arranged to substantially completely obscure said weapon and scope means from the view of persons in said limited region, electronic image sensor means optically coupled with said scope means to receive an optical image therefrom and substantially completely obscured from the view of persons in said limited region; a surveillance and control station disposed outside of said limited region, said station including a video surveillance screen operatively connected to said image sensor to exhibit a video image derived from said image sensor, a movement control unit operatively connected to said weapon and scope means and operable to produce at least pan and tilt movements of the weapon and scope means, and remote weapon firing means operatively connected to the weapon for firing the weapon through said screen means wherein said limited region has a ceiling and a space is defined above said ceiling, said one-way vision screen means being mounted proximate said ceiling, with said weapon and scope means disposed in said space above the ceiling, said one-way vision screen means being mounted above a drop ceiling in a room of a building, and a mobile unit mounted for linear travel behind said screen means, said weapon and scope means of said image sensor means being mounted on said mobile unit, with said weapon and scope means being mounted on said mobile unit for pan and tilt movability, said movement control unit being operatively connected to said mobile unit and to the weapon and scope means thereon to produce linear travel movement of the mobile unit and pan and tilt movements of the weapon and scope means.

* * * * *